US007079006B1

(12) United States Patent
Abe

(10) Patent No.: US 7,079,006 B1
(45) Date of Patent: Jul. 18, 2006

(54) RADIO PAGING RECEIVER AND MESSAGE ERASING METHOD

(75) Inventor: Yasushi Abe, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/332,298

(22) Filed: Jun. 11, 1999

(30) Foreign Application Priority Data

Jun. 24, 1998 (JP) ................................ 10-192338

(51) Int. Cl.
*G05B 19/00* (2006.01)
*G06F 7/00* (2006.01)
*G08B 29/00* (2006.01)
*H04B 1/00* (2006.01)
*H04Q 9/00* (2006.01)

(52) U.S. Cl. .................. 340/5.22; 340/5.23; 340/5.24; 340/5.27

(58) Field of Classification Search ................ 340/5.2, 340/5.1, 5.8, 7.2, 7.38, 7.39, 7.41, 7.52, 7.56, 340/10.51, 10.52, 5.22, 5.23–5.28, 5.3, 7.3, 340/7.5; 455/38.4, 186.1
See application file for complete search history.

(56) References Cited

U.S. PATENT DOCUMENTS 5,140,561 A * 8/1992 Miyashita et al. ............ 368/10
5,173,688 A * 12/1992 DeLuca et al. ............ 340/7.55
5,239,679 A * 8/1993 Murai ....................... 455/38.1
5,426,424 A * 6/1995 Vanden Heuvel et al. ..................... 340/825.44
5,455,579 A * 10/1995 Bennett et al. ............. 341/110
5,726,642 A * 3/1998 Kudoh et al. .......... 340/825.44
5,856,787 A * 1/1999 Ikka .......................... 340/7.41
5,973,615 A * 10/1999 Shima .................. 340/825.44
6,058,290 A * 5/2000 Katagiri ..................... 455/38.4
6,072,411 A * 6/2000 Yoshioka ..................... 341/94
6,124,801 A * 9/2000 Yamazaki ............. 340/825.44
6,201,959 B1 * 3/2001 Kawashima ................ 455/412
6,259,892 B1 * 7/2001 Helferich .................. 455/31.3
6,272,319 B1 * 8/2001 Narusawa .................. 455/38.4
6,313,736 B1 * 11/2001 Hymel et al. ............. 340/7.56
6,343,219 B1 * 1/2002 Wada ......................... 455/550
6,804,817 B1 * 10/2004 Kimura et al. ............. 719/315

* cited by examiner

*Primary Examiner*—Wendy R. Garber
*Assistant Examiner*—Nam Nguyen
(74) *Attorney, Agent, or Firm*—Pearne & Gordon LLP

(57) ABSTRACT

Message data are picked up by using a decoder 2 from received signals received by a receiver portion 1 of a radio paging receiver, and stored in a RAM 4*a* of a CPU 4. An informing portion 9 informs a user of the message. The user designates any character sequences in the message stored in the RAM 4*a* by a character sequence designating unit 4*b*. A character sequence retrieving unit 4*c* retrieves whether or not designated character sequences are contained in stored messages. When the messages containing the designated character sequences are detected, a time counting unit 4*d* monitors whether or not a predetermined time has been lapsed after storage of concerned messages. An erasing unit 4*e* erases unnecessary messages stored in the RAM 4*a* from the RAM 4*a* after the predetermined time has been lapsed. Accordingly, the messages which are transmitted periodically and repeatedly to the radio paging receiver can be erased collectively and automatically and thus complicatedness in erasing the messages can be eliminated and also operability can be enhanced.

29 Claims, 17 Drawing Sheets

RADIO PAGING RECEIVER AND MESSAGE ERASING METHOD

BACKGROUND OF THE INVENTION

1. Field of the Invention

The present invention relates to a radio paging receiver and, more particularly, a radio paging receiver for displaying/calling a message corresponding to message data in a radio signal which is transmitted from a base station of a radio paging system.

2. Description of the Prior Art

FIG. 17 is a block diagram showing a circuit configuration of a radio paging receiver in the prior art. In FIG. 17, a receiver portion 21 is a circuit which receives a radio signal transmitted from a base station of a radio paging system via an antenna 21*a*, and then demodulates the radio signal into a digital signal. A decoder 22 is a circuit which applies a bit synchronization process and an error correction process to the received signal being converted into the digital signal, and then collates an address in the received signal with own address loaded in a memory portion 23. The memory portion 23 is a memory unit which has a memory element for erasing and writing data electrically, e.g., EEPROM (Electrically Erasable Programmable Read Only Memory), etc., and stores own address of the radio paging receiver, etc. A CPU 24 is a CPU (Central Processing Unit) which controls peripheral circuits based on the received signal sent out from the decoder 22.

A display driver 25 is a circuit which drives a display portion 26 based on a display signal issued from the CPU 24. The display portion 26 is a unit which is driven by the display driver 25, and then displays data, etc. by liquid crystal elements, etc. in response to the display signal. A switch portion 27 is a unit which generates instructions according to the user's operation and various data. A signal issued from the switch portion 27 is input into the CPU 24 via the decoder 22. An informing driver 28 is a circuit which controls an informing portion 29 consisting of a speaker, a vibrator, etc.

Next, an operation of the above radio paging receiver will be explained hereunder. In the radio paging receiver, the receiver portion 21 receives the radio signal being transmitted from the base station (referred simply to as a "base station" hereinafter) of the radio paging system via the antenna 21*a* at a predetermined timing controlled by the CPU, then converts the radio signal into the digital signal by amplifying, frequency-converting, detecting and demodulating the received radio signal, and then sends out the digital signal to the decoder 22. The decoder 22 applies the bit synchronization process and the error correction process to the digital signal supplied from the receiver portion 21, and then collates an address contained in the received signal with own address read from the memory portion 23 via the CPU 24 to confirm whether or not the received signal is directed to own radio paging receiver.

If the received signal is directed to own radio paging receiver and message data is contained in the received signal, the decoder 22 picks up the message data, and then sends out the message data to the CPU 24 and also outputs a driving signal to the informing driver 28. In parallel with this calling operation, the CPU 24 converts the message data into the display signal which consists of a combination of bit codes each having the predetermined bit number, and then sends out the display signal to the display driver 25. The display driver 25 drives the display portion 26 based on the display signal sent out from the CPU 24 to display the message corresponding to the message data on the display portion 26. After the calling operation has been completed, the CPU 24 stores the message data in a RAM 24*a*.

In this manner, in the prior art, the radio paging receiver receives the radio signal sent out from the base station, then executes the calling operation by a ringer tone, etc. and displays the message contained in the radio signal, and then stores the message data in a RAM.

However, according to the above radio paging receiver, when the message data cannot be stored in a storage area, they are erased automatically in the order of older receiving time or they are erased from the storage area separately or collectively according to the user's operation. In addition, in case an information broadcasting service is carried out by using the radio paging receiver, various information such as daily divination, sports prompt report, weather forecast, etc., which are available only on a certain day, are stored in the message storage area.

Accordingly, according to the radio paging receiver in the prior art, the user must erase the stale information from the storage area each time. As a result, the radio paging receiver has such a problem that its utilization has become troublesome because of the frequent user's operation of erasing the message data, and thus the storage area has not been able to be utilized effectively.

SUMMARY OF THE INVENTION

The present invention has been made to overcome the above problem, and it is an object of the present invention to provide a radio paging receiver which is capable of releasing the user from the complicatedness to erase message and also utilizing effectively a message storage area by not storing the message therein or by erasing the message therefrom automatically.

In order to overcome the above problems, according to the present invention, there is provided a radio paging receiver including a receiving means for receiving a radio signal from a base station of a radio paging system, a first decoding means for picking up one calling address or a plurality of calling addresses assigned to own receiver from the radio signal received by the receiving means and picking up message data corresponding to the calling address or the calling addresses from the radio signal, and a data storing means for storing the message data, the radio paging receiver comprising a character sequence designating means for designating character sequences in stored messages; a character sequence retrieving means for detecting whether or not designated character sequences are contained in stored messages; a time counting means for monitoring whether or not a predetermined time has lapsed after the messages are stored; and an erasing means for erasing the stored messages from a storage area. According to such configuration, concerned messages can be erased when it is detected by the character sequence retrieving means that the designated character sequences are contained in the stored messages and it is detected by the time counting means that the predetermined time has lapsed after the messages are stored.

Also, according to the present invention, the radio paging receiver comprises a character sequence inputting means, the character sequence retrieving means, the time counting means, and the erasing means. According to such configuration, character sequences which are retrieved to erase messages can be input by the character sequence inputting means.

Also, according to the present invention, the radio paging receiver comprises the first decoding means for picking up a plurality of calling addresses assigned to own receiver and picking up message data corresponding to the calling addresses, an address associated storing means for storing the message data picked up by the first decoding means every calling address; an address setting means for designating the calling addresses as objects of erasure by time counting; the time counting means, and the erasing means. According to such configuration, erasure of the messages can be effected by the address setting means and the time counting means.

Also, according to the present invention, the radio paging receiver comprises a second decoding means for picking up message data which are classified into a hierarchical structure and transmitted to own address; a hierarchy associated storing means for storing the message data which are picked up by the second decoding means every hierarchy; a hierarchy setting means for designating hierarchies as objects of erasure by time counting; the time counting means, and the erasing means. According to such configuration, erasure of the messages can be effected by the hierarchy setting means and the time counting means.

Also, according to the present invention, the radio paging receiver comprises a time setting means for inputting times as timings for erasure of the messages by a user; a time monitoring means for monitoring whether or not a time coincides with an input time; and the erasing means. According to such configuration, the erasure of the messages which contain predetermined character sequences or belong to predetermined addresses or predetermined hierarchies can be effected periodically and automatically at respective times which are input by the user.

Also, according to the present invention, the radio paging receiver comprises a day-of-the-week setting means for inputting a day of the week as timings for erasure of the messages by a user; a day-of-the-week monitoring means for monitoring whether or not a day of the week coincides with an input day of the week; and the erasing means. According to such configuration, the erasure of the messages which contain predetermined character sequences or belong to predetermined addresses or predetermined hierarchies can be effected periodically and automatically at respective days of the week which are input by the user.

According to the present invention, there is provided a radio paging receiver including a receiving means, a first decoding means, a data storing means for storing the message data picked up by the first decoding means, and one address or a plurality of addresses, the radio paging receiver comprising a character sequence designating means for designating character sequences in stored messages; a received character sequence retrieving means for detecting whether or not designated character sequences are contained in received messages; and an erasing means for erasing the messages. According to such configuration, when designated character sequences are contained in the received messages, the messages cannot be stored in a storage area but can be erased after the messages have been checked.

Also, according to the present invention, the radio paging receiver comprises a character sequence inputting means, the character sequence retrieving means, and the erasing means. According to such configuration, character sequences which are retrieved to erase messages can be input by the character sequence inputting means after the messages have been checked at the time of reception.

Also, according to the present invention, the radio paging receiver comprises a second decoding means for picking up a plurality of calling addresses assigned to own receiver and picking up message data which are transmitted to own address; a storing means for storing the message data which are picked up by the second decoding means every address; an address setting means for designating addresses as objects of erasure at a time of reception; and the erasing means. According to such configuration, the messages related to particular addresses cannot be stored in the storage area but can be erased after the messages have been checked.

Also, according to the present invention, the radio paging receiver comprises a third decoding means for picking up message data which are classified into a hierarchical structure and transmitted to own address; a second storing means for storing the message data which are picked up by the third decoding means every hierarchy; a hierarchy setting means for designating hierarchies as objects of erasure at a time of reception; and the erasing means. According to such configuration, the messages belonging to particular hierarchies cannot be stored in the storage area but can be erased after the messages have been checked.

According to the present invention, there is provided a radio paging receiver including the receiving means, the first decoding means, the data storing means, and one address or a plurality of addresses, the radio paging receiver comprising a character sequence designating means for designating character sequences in stored messages; a stored character sequence retrieving means for detecting whether or not designated character sequences are contained in stored messages; and an erasing means for erasing the messages. According to such configuration, when designated character sequences are contained in the stored messages, the messages can be erased collectively concerned messages.

Also, according to the present invention, the radio paging receiver comprises a character sequence inputting means, the character sequence retrieving means, and the erasing means. According to such configuration, character sequences which are retrieved to erase collectively messages can be input by the character sequence inputting means.

Also, according to the present invention, the radio paging receiver comprises a second decoding means for picking up a plurality of calling addresses assigned to own receiver and picking up message data which are transmitted to own address; a first storing means for storing the message data which are picked up by the second decoding means every address; an address setting means for designating addresses as objects of erasure according to character sequence conditions; and the erasing means. According to such configuration, the messages related to particular addresses can be erased collectively when the messages contain designated character sequences.

Also, according to the present invention, the radio paging receiver comprises a third decoding means for picking up message data which are classified into a hierarchical structure and transmitted to own address; a second storing means for storing the message data which are picked up by the third decoding means every hierarchy; a hierarchy setting means for designating hierarchies as objects of erasure according to character sequence conditions; and the erasing means. According to such configuration, the messages belonging to particular hierarchies can be erased collectively when the messages contain designated character sequences.

Furthermore, according to the present invention, there is provided a message erasing method for the above-mentioned radio paging receiver.

DESCRIPTION OF THE PREFERRED EMBODIMENTS

Subsequently, embodiments of the present invention will be explained in detail with reference to FIGS. 1 to 16 hereinafter.

First Embodiment

A first embodiment of the present invention corresponds to a radio paging receiver which can designate any character sequences in stored messages, and then erase the concerned messages automatically after a predetermined time has been lapsed from the time when the messages containing the character sequences are stored.

Figure 1:
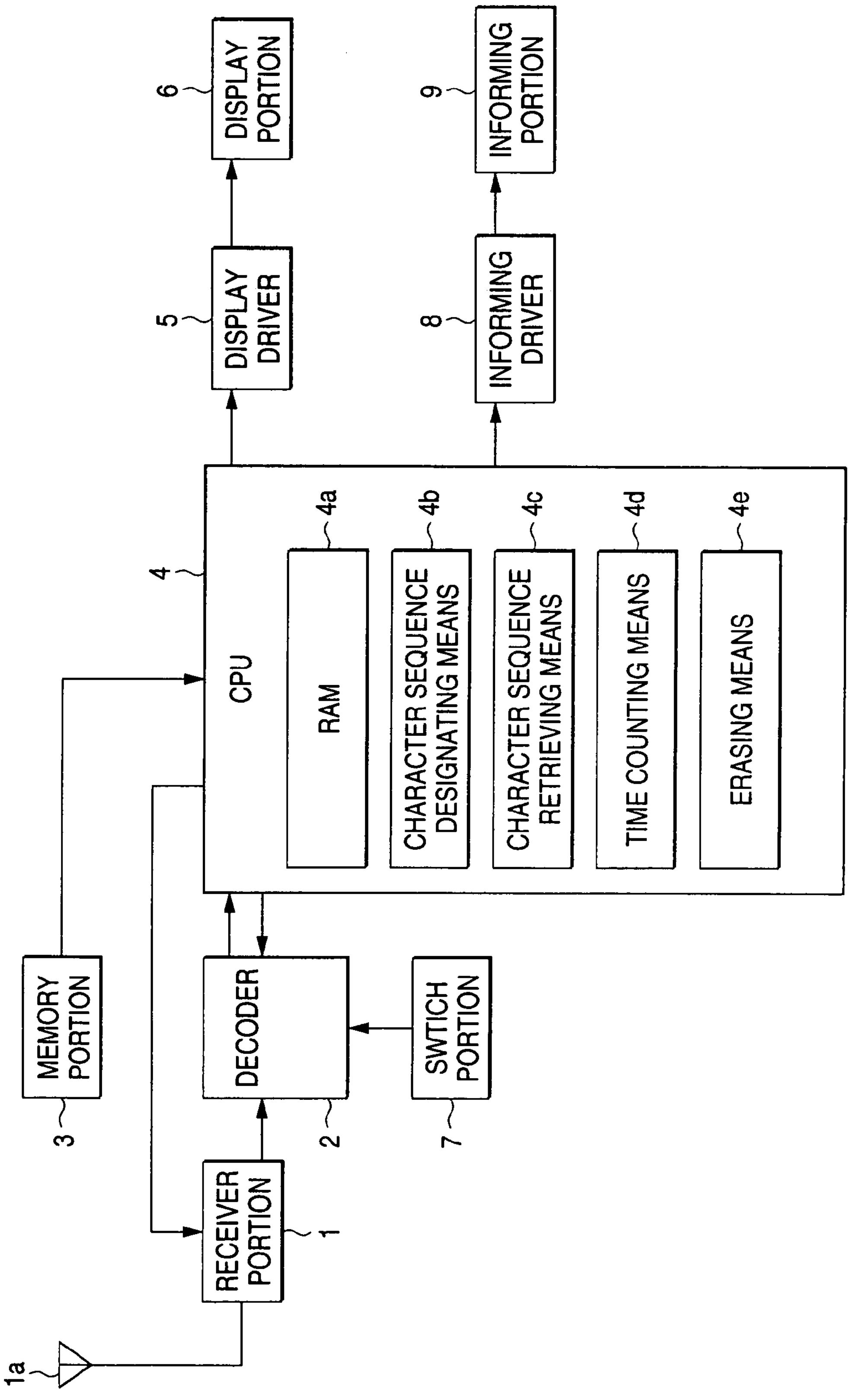
FIG. 1 is a block diagram showing a circuit configuration of a radio paging receiver according to a first embodiment of the present invention.

FIG. 1 is a block diagram showing a circuit configuration of the radio paging receiver according to the first embodiment of the present invention. In FIG. 1, a receiver portion 1 is a circuit which receives a radio signal transmitted from a base station (not shown) of a radio paging system, and then demodulates the radio signal into a digital signal. A decoder 2 is a circuit which applies a bit synchronization process and an error correction process to the received signal which has been converted into the digital signal, and then collates an address in the received signal with own address loaded in a memory portion 3. The memory portion 3 is a memory unit which has a memory element for erasing and writing data electrically, e.g., the EEPROM, etc., and stores own address of the radio paging receiver, etc. A CPU 4 is a CPU which controls various peripheral circuits. A display driver 5 is a circuit which drives a display portion 6 based on a display signal issued from the CPU 4. The display portion 6 is a unit which is driven by the display driver 5, and then displays data, etc. by liquid crystal elements, etc. in response to the display signal. A switch portion 7 is a unit which generates instructions according to the user's operation and various data. A signal issued from the switch portion 7 is input into the CPU 4 via the decoder 2. An informing driver 8 is a circuit which drives an informing portion 9 consisting of a speaker, a vibrator, etc.

Next, an operation of the radio paging receiver according to the first embodiment of the present invention will be explained hereunder. In the radio paging receiver, the receiver portion 1 receives the radio signal being transmitted from the base station of the radio paging system via the antenna 1*a*. The receiver portion 1 then converts the radio signal into the digital signal by amplifying, frequency-converting, detecting and demodulating the received radio signal. The receiver portion 1 then sends out the digital signal to the decoder 2. The decoder 2 applies the bit synchronization process and the error correction process to the digital signal supplied from the receiver portion 1. The decoder 2 then collates an address contained in the received signal with own address being read from the memory portion 3 via the CPU 4 to detect whether or not the received signal is directed to own radio paging receiver.

If the received signal is directed to own radio paging receiver and the message data is contained in the received signal, the decoder 2 takes out the message data. The decoder 2 then sends out the message data to the CPU 4 and also outputs a driving signal to the informing driver 8.

The CPU 4 has a character sequence designating means 4*b* which can designate any character sequences by the user from the messages stored in a RAM 4*a*. The CPU 4 also has a character sequence retrieving means 4*c* which can retrieve whether or not the character sequences being designated by the character sequence designating means 4*b* are contained in the received messages. The CPU 4 also has a time counting means 4*d* which counts a predetermined lapsed time from the storing operation if the messages in which the designated character sequences are contained are detected. The CPU 4 also has an erasing means 4*e* which erases the messages stored in the RAM 4*a* from the RAM 4*a*.

In the first embodiment of the present invention, the RAM 4*a* for storing the message is built in the CPU 4. However, the RAM may be provided on the outside of the CPU in place of the built-in type RAM.

Figure 2:
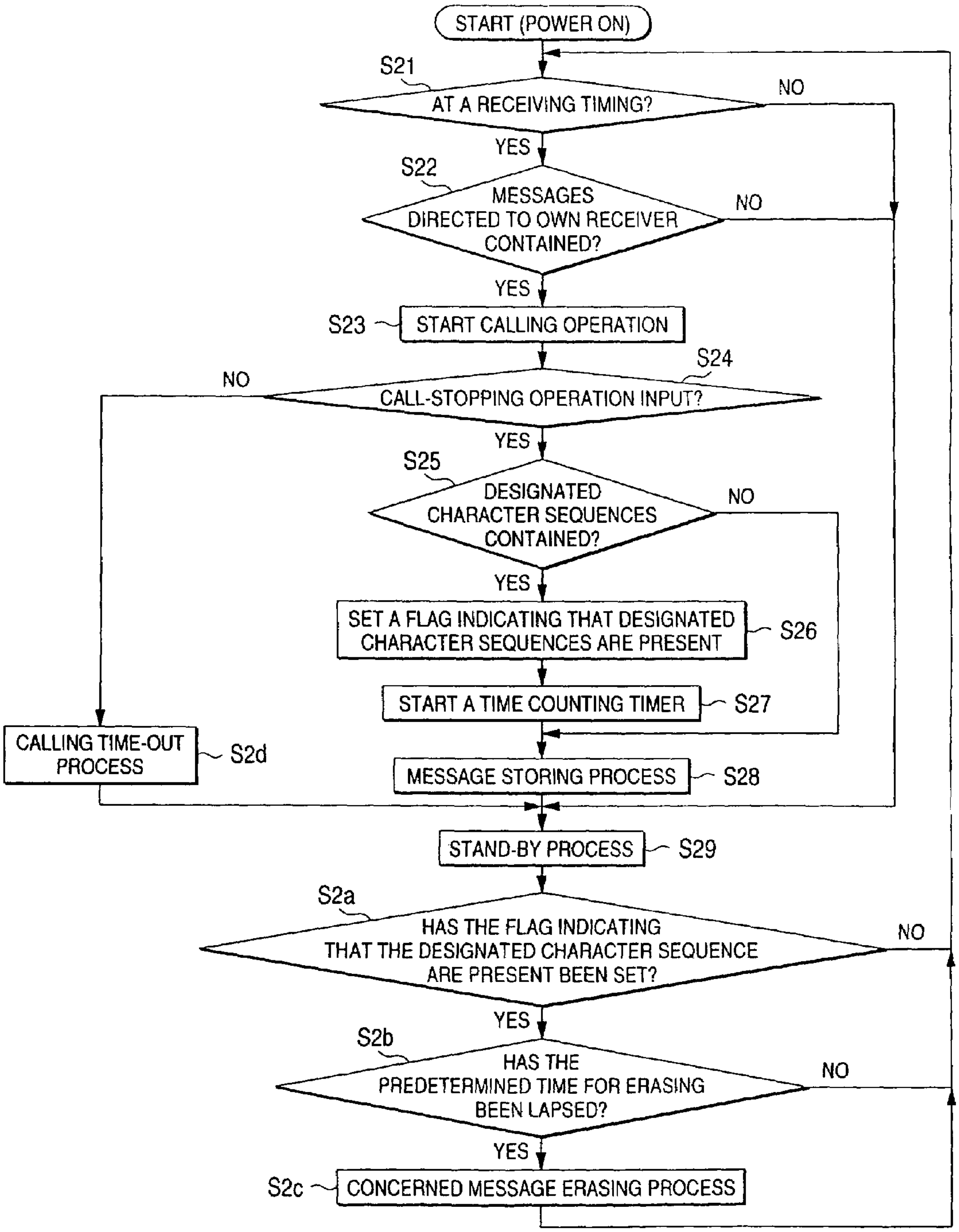
FIG. 2 is a flowchart showing a message erasing method for the radio paging receiver according to the first embodiment of the present invention.

FIG. 2 is a flowchart showing an automatic message erasing process in the radio paging receiver according to the first embodiment of the present invention. The automatic message erasing process will be explained with reference to FIG. 2 hereunder.

Under the condition of the radio paging receiver which is synchronized with the base station by turning on the power supply, the radio paging receiver decides whether or not it is at a receiving timing assigned to own radio paging receiver (step S21). Unless the radio paging receiver has been at the receiving timing in step S21, it keeps a stand-by state according to a stand-by process (step S29). If the radio paging receiver has been at the receiving timing in step S21, it decides whether or not the message (information) directed to own radio paging receiver is contained in the data being received from the base station (step S22). Unless the message directed to own radio paging receiver has been contained in step S22, the radio paging receiver is shifted into the stand-by state according to the stand-by process in step S29. If the received message has been contained in step S22, a calling operation is started (step S23) and then the radio paging receiver waits whether or not the call-stopping operation is input by the user (step S24). Unless the call-stopping operation has been input by the user in step S24, the radio paging receiver performs a calling time-out process after a predetermined time (step S2*d*) and then it is shifted into the stand-by state in step S29. In contrast, if the user performs the call-stopping operation by the switch portion 7 (FIG. 1) during the calling operation in step S24, the radio paging receiver shifts to step S25 to retrieve whether or not the designated character sequences are contained in the received message. Unless no designated character sequence has been contained in step S25, the message is stored in the RAM 4*a* (FIG. 1) according to a message storing process (step S28). If the designated character sequences have been contained in the received message in step S25, a flag indicating that the designated character sequences are present is set (step S26), then a time counting means 4*d* (FIG. 1) for counting a predetermined time required until erase of the message is started (step S27) prior to the message storing process (step S28). In this case, any character sequences can be designated as the designated character sequences among stored messages by the user previously by using the character sequence designating means 4*b* (FIG. 1). The predetermined time required until erase of the message can be held fixedly previously by using the time counting means 4*d* (FIG. 1). After the message has been stored (step 28), the process is shifted into the stand-by state according to the stand-by process (step S29). At that time, it is decided whether or not the flag indicating that the designated character sequences are present has been set (step S2*a*). If the flag has been set in step S2*a*, a decision process is effected to decide whether or not a predetermined time required for the erasing operation has been lapsed (step S2*b*) after the message has been stored. If the predetermined time has been lapsed in step S2*b*, the concerned message erasing process is carried out to erase the messages which contain the designated character sequences (step S2*c*). If both conditions in step S2*a* and step S2*b* are not satisfied, the processes from step S21 to step S29 are executed repeatedly to execute the operation to wait for the receiving timing which is assigned to own radio paging receiver.

As described above, according to the radio paging receiver of the first embodiment of the present invention, complicatedness in erasing the messages unnecessary for the user can be reduced by designating any character sequences from the stored messages to set any character sequences and then erasing automatically the messages containing the designated character sequences after a predetermined time has been lapsed from the time when the messages containing the character sequences are stored, for example, by erasing automatically the messages (information) such as weather forecast, etc. which are available limitatively on a certain day after a predetermined time has been lapsed from their storage.

The character sequences may be set by inputting the characters by the switch portion 7. In this case, the similar advantage can be achieved.

Second Embodiment

A second embodiment of the present invention corresponds to a radio paging receiver which can erase automatically the message with designated addresses after a predetermined time has been lapsed from the storing operation of the message.

Figure 3:
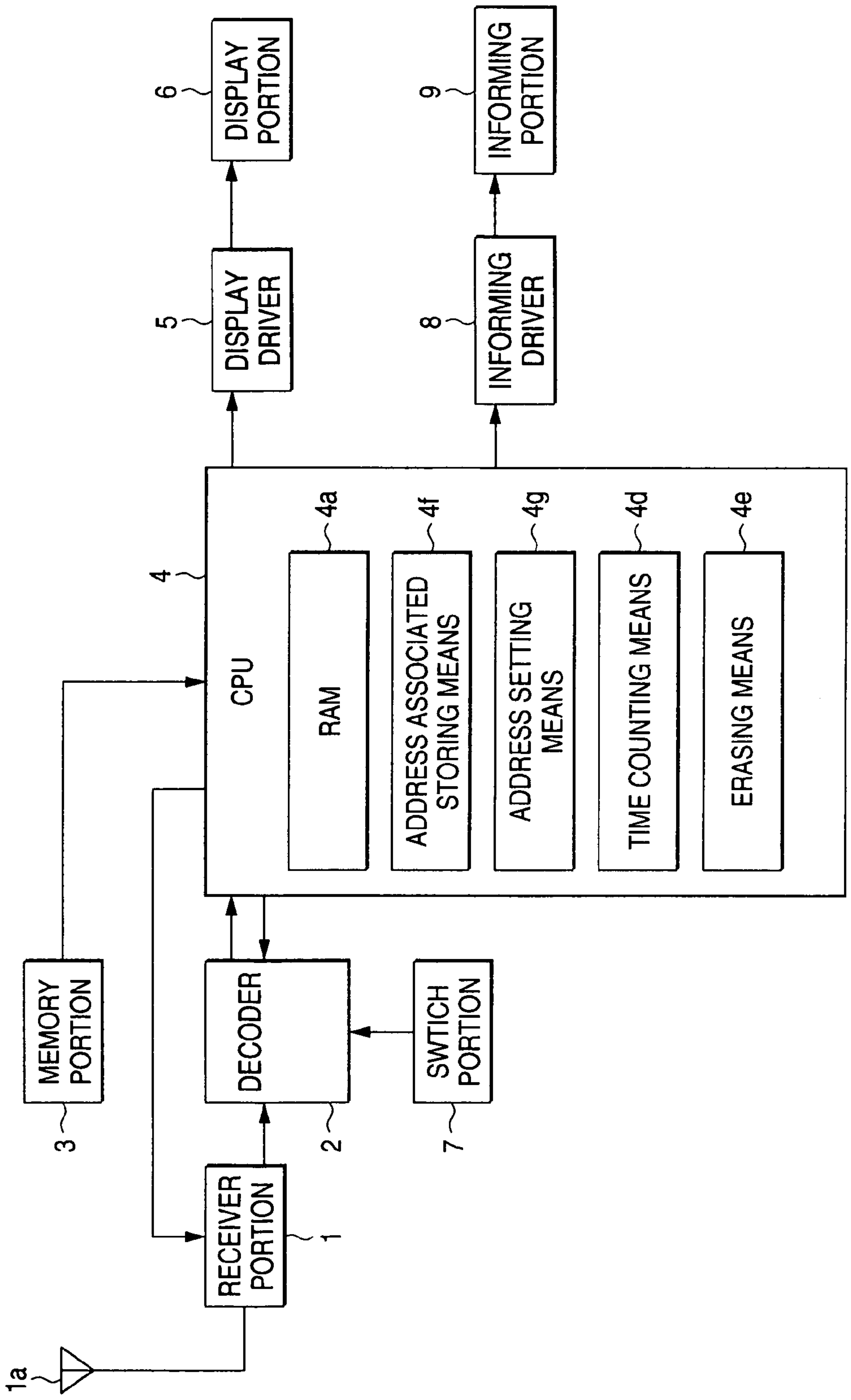
FIG. 3 is a block diagram showing a circuit configuration of a radio paging receiver according to a second embodiment of the present invention.

FIG. 3 is a block diagram showing a circuit configuration of the radio paging receiver according to the second embodiment of the present invention. In FIG. 3, the same symbols as those in FIG. 1 are affixed to constituent elements corresponding to the constituent elements which have been explained with reference to FIG. 1, and their explanation will be omitted. A difference between the radio paging receiver according to the second embodiment and radio paging receiver according to the first embodiment resides in that an address associated storing means 4*f* and an address setting means 4*g* are provided to the CPU 4.

In FIG. 3, the address associated storing means 4*f* is a means which enables to store the messages while discriminating each address employed in the receiving operation among a plurality of addresses when the messages are to be stored in the RAM 4*a*. The address setting means 4*g* is a means which sets the addresses selected as objects when the messages are erased automatically after a predetermined time has been lapsed after the storing operation. This setting is executed according to an instruction signal issued by the user's operation of the switch portion 7.

Figure 4:
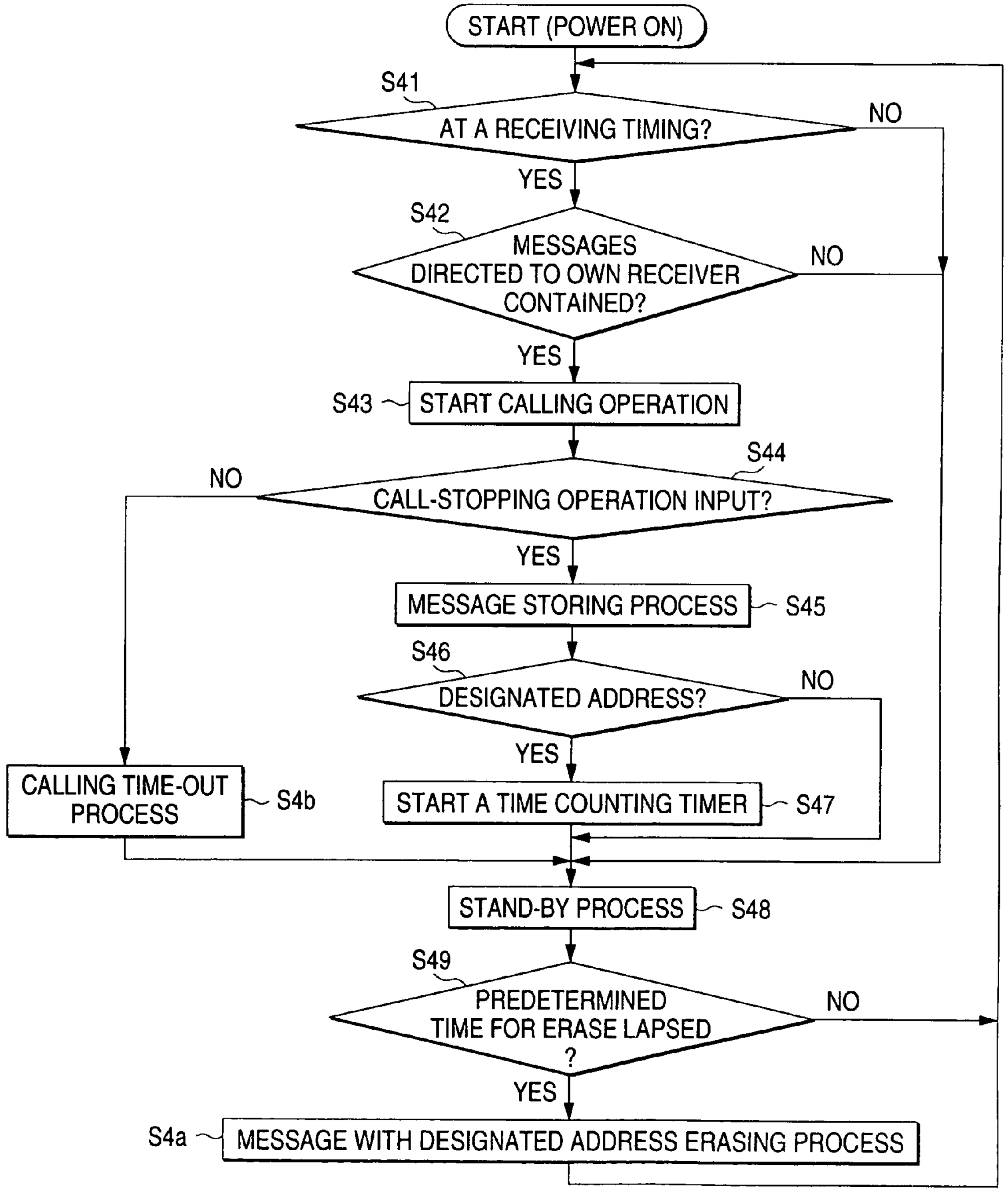
FIG. 4 is a flowchart showing a message erasing method for the radio paging receiver according to the second embodiment of the present invention.

FIG. 4 is a flowchart showing an automatic message erasing process in the radio paging receiver according to the second embodiment of the present invention. The automatic message erasing process will be explained with reference to FIG. 4 hereunder.

Under the condition of the radio paging receiver which is synchronized with the base station by turning on the power supply, the radio paging receiver decides whether or not it is at a receiving timing assigned to own radio paging receiver (step S41). Unless the radio paging receiver has been at the receiving timing in step S41, it keeps a stand-by state according to a stand-by process (step S48). In contrast, if the radio paging receiver has been at the receiving timing in step S41, it decides whether or not the messages (information) directed to own radio paging receiver are contained in the data being received from the base station (step S42). Unless the message directed to own radio paging receiver has been contained in step S42, the radio paging receiver is shifted into the stand-by state according to the stand-by process in step S48. If the message directed to own radio paging receiver has been contained in step S42, a calling operation is started (step S43) and then the radio paging receiver waits whether or not the call-stopping operation is input by the user (step S44). Unless the call-stopping operation has been input by the user in step S44, the radio paging receiver performs a calling time-out process after a predetermined time (step S4*b*) and then it is shifted into the stand-by state in step S48. In contrast, if the user performs the call-stopping operation by the switch portion 7 (FIG. 3) during the calling operation in step S44, the message is stored in the RAM 4*a* (FIG. 3) by the message storing process (step S45). If the received message has had the designated address in step S46, a time counting means 4*d* (FIG. 3) for counting a predetermined time required until erase of the message is started (step S47). Unless the received message has had the designated address in step S46, the time counting means 4*d* (FIG. 3) is not started and then the process goes to step S48. In this case, the designated address can be designated previously by the user by using the address setting means 4*g* (FIG. 3). The messages are stored in the RAM 4*a* (FIG. 3) by using the address associated storing means 4*f* (FIG. 3) such that the addresses can be identified from each other. Also, the predetermined time required until erase of the message can be fixedly held previously by using the time counting means 4*d* (FIG. 3).

Then, the radio paging receiver is shifted into the stand-by state according to the stand-by process (step S48), and then a decision process is carried out to decide whether or not the predetermined time has been lapsed after the message has been stored (step S49). If the predetermined time has been lapsed in step S49, the messages which have the designated addresses are erased (step S4*a*). Unless the predetermined time has been lapsed in step S49, the processes from step S41 to step S49 are repeated to execute the operation to wait for the receiving timing which is assigned to own radio paging receiver.

As described above, according to the radio paging receiver of the second embodiment of the present invention, since the radio paging receiver is constructed to erase the concerned messages automatically after a predetermined time has been lapsed from the time when such messages with the designated addresses are stored, complicatedness in erasing the messages unnecessary for the user can be reduced by erasing automatically the messages with the addresses, which have a relatively low degree of importance for the user, from all the stored messages after a predetermined time has been lapsed from the time when such messages are stored.

Third Embodiment

A third embodiment of the present invention corresponds to a radio paging receiver which can erase automatically the messages belonging to the designated hierarchy after a predetermined time has been lapsed from the storing operation.

Figure 5:
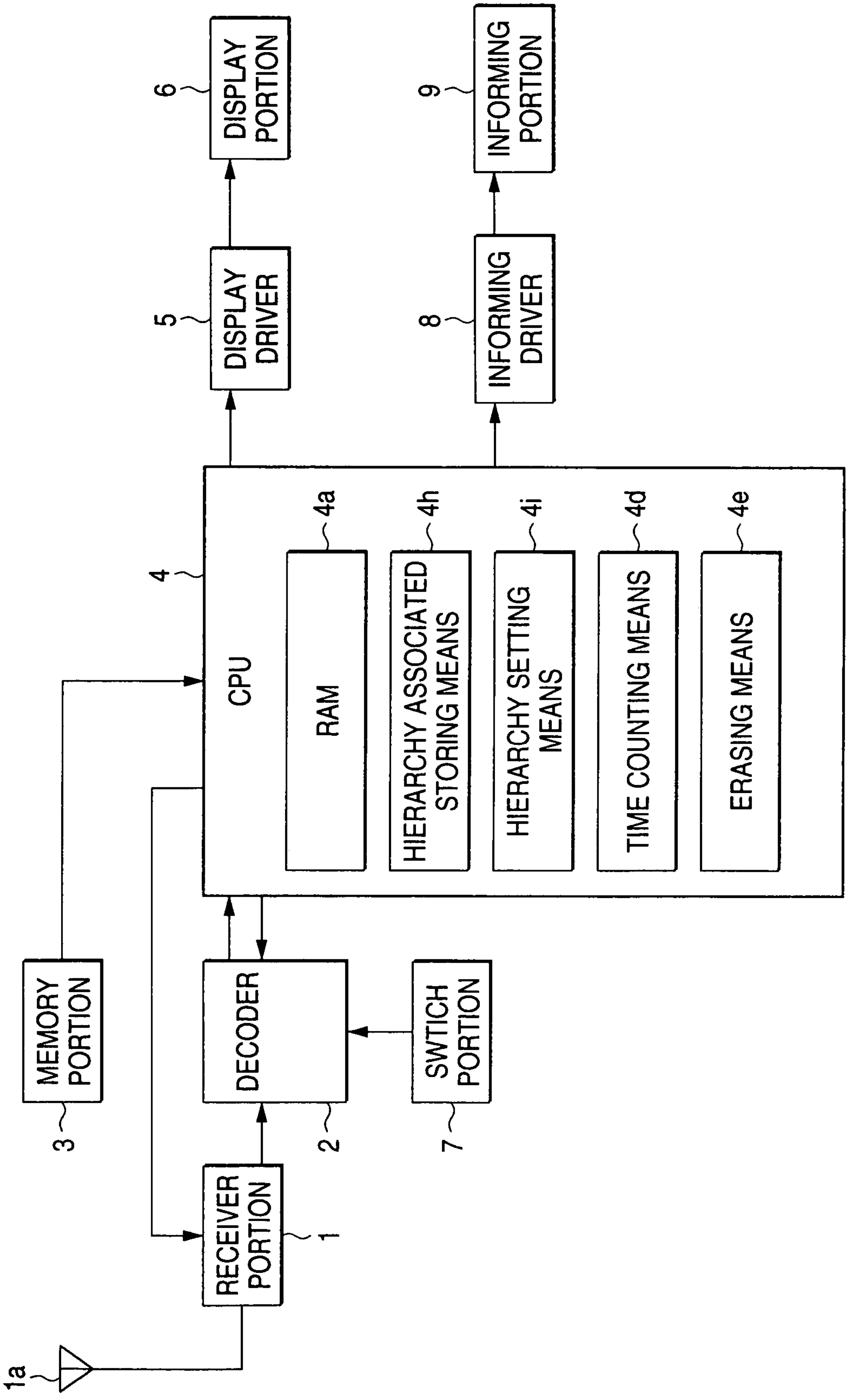
FIG. 5 is a block diagram showing a circuit configuration of a radio paging receiver according to a third embodiment of the present invention.

FIG. 5 is a block diagram showing a circuit configuration of the radio paging receiver according to the third embodiment of the present invention. In FIG. 5, the same symbols as those in FIG. 1 are affixed to constituent elements corresponding to the constituent elements which have been explained with reference to FIG. 1, and their explanation will be omitted. A difference between the radio paging receiver according to the third embodiment and radio paging receiver according to the first embodiment resides in that a hierarchy associated storing means 4*h* and a hierarchy setting means 4*i* are provided to the CPU 4.

In FIG. 5, the hierarchy associated storing means 4*h* which enables to store the messages which are identified and transmitted as an hierarchical structure according to respective hierarchies (fields), while discriminating each hierarchy (field) employed in the receiving operation among a plurality of hierarchies (fields) at certain addresses when the messages are to be stored in the RAM 4*a*. The hierarchy setting means 4*i* is a means which sets the hierarchies selected as objects when the messages are erased automatically after a predetermined time has been lapsed after the storing operation. This setting is executed according to an instruction signal issued by the user's operation of the switch portion 7.

Figure 6:
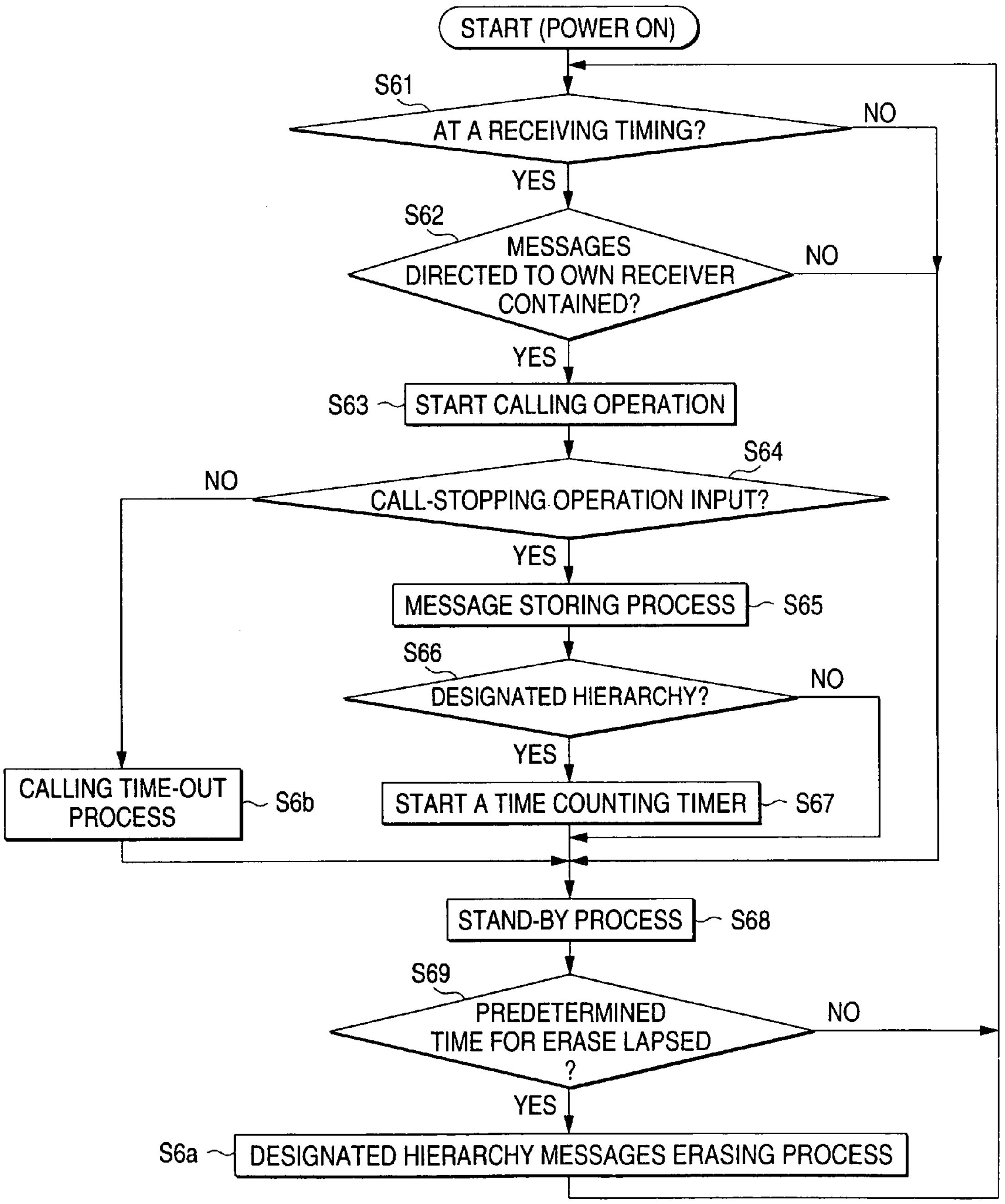
FIG. 6 is a flowchart showing a message erasing method for the radio paging receiver according to the third embodiment of the present invention.

FIG. 6 is a flowchart showing a message automatic erasing process in the radio paging receiver according to the third embodiment of the present invention. The automatic message erasing process will be explained with reference to FIG. 6 hereunder.

Under the condition of the radio paging receiver which is synchronized with the base station by turning on the power supply, the radio paging receiver decides whether or not it is at a receiving timing assigned to own radio paging receiver (step S61). Unless the radio paging receiver has been at the receiving timing in step S61, it keeps a stand-by state according to a stand-by process (step S68). If the radio paging receiver has been at the receiving timing in step S61, it decides whether or not the message (information) directed to own radio paging receiver is contained in the data being received from the base station (step S62). Unless the message directed to own radio paging receiver has been contained in step S62, the radio paging receiver is shifted into the stand-by state according to the stand-by process in step S68. If the message directed to own radio paging receiver has been contained in the received messages in step S62, a calling operation is started (step S63) and then the radio paging receiver waits whether or not the call-stopping operation is input by the user (step S64). Unless the call-stopping operation has been input by the user in step S64, the radio paging receiver performs a calling time-out process after a predetermined time (step S6*b*) and then it is shifted into the stand-by state in step S68. In contrast, if the user performs the call-stopping operation by the switch portion 7 (FIG. 5) during the calling operation in step S64, the message is stored in the RAM 4*a* (FIG. 5) by the message storing process (step S65). If the received message has belonged to the designated hierarchies in step S66, a time counting means 4*d* (FIG. 5) for counting a predetermined time from storage to erase of the message is started (step S67). Unless the stored messages has belonged to the designated hierarchies in step S66, the time counting means 4*d* (FIG. 5) is not started and then the process goes to step S68. In this case, the designated hierarchies can be designated previously by the user by using the hierarchy setting means 4*i* (FIG. 5). The messages are stored in the RAM 4*a* (FIG. 5) by using the hierarchy associated storing means 4*h* (FIG. 5) such that the hierarchies can be identified from each other. Also, the predetermined time required to erase the message can be fixedly held previously by using the time counting means 4*d* (FIG. 5).

Then, the radio paging receiver is shifted into the stand-by state according to the stand-by process (step S68), and then a decision process is carried out to decide whether or not the predetermined time has been lapsed after the message has been stored (step S69). If the predetermined time has been lapsed in step S69, the messages which have belonged to the designated hierarchies are erased (step S6*a*). Unless the predetermined time has been lapsed in step S69, the processes from step S61 to step S69 are repeated to execute the operation to wait for the receiving timing which is assigned to own radio paging receiver.

As described above, according to the radio paging receiver of the third embodiment of the present invention, since the messages belonging to the designated hierarchies can be erased automatically from the stored messages after a predetermined time has been lapsed from the storing operation, complicatedness in erasing the messages unnecessary for the user can be reduced by erasing automatically the messages (information) belonging to the hierarchies (fields), which have a relatively low degree of importance for the user, from all the stored messages after a predetermined time has been lapsed from the time when such messages are stored.

Fourth Embodiment

A fourth embodiment of the present invention corresponds to a radio paging receiver which can designate any character sequences in stored messages and then erase automatically the messages containing the designated character sequences at a predetermined time.

Figure 7:
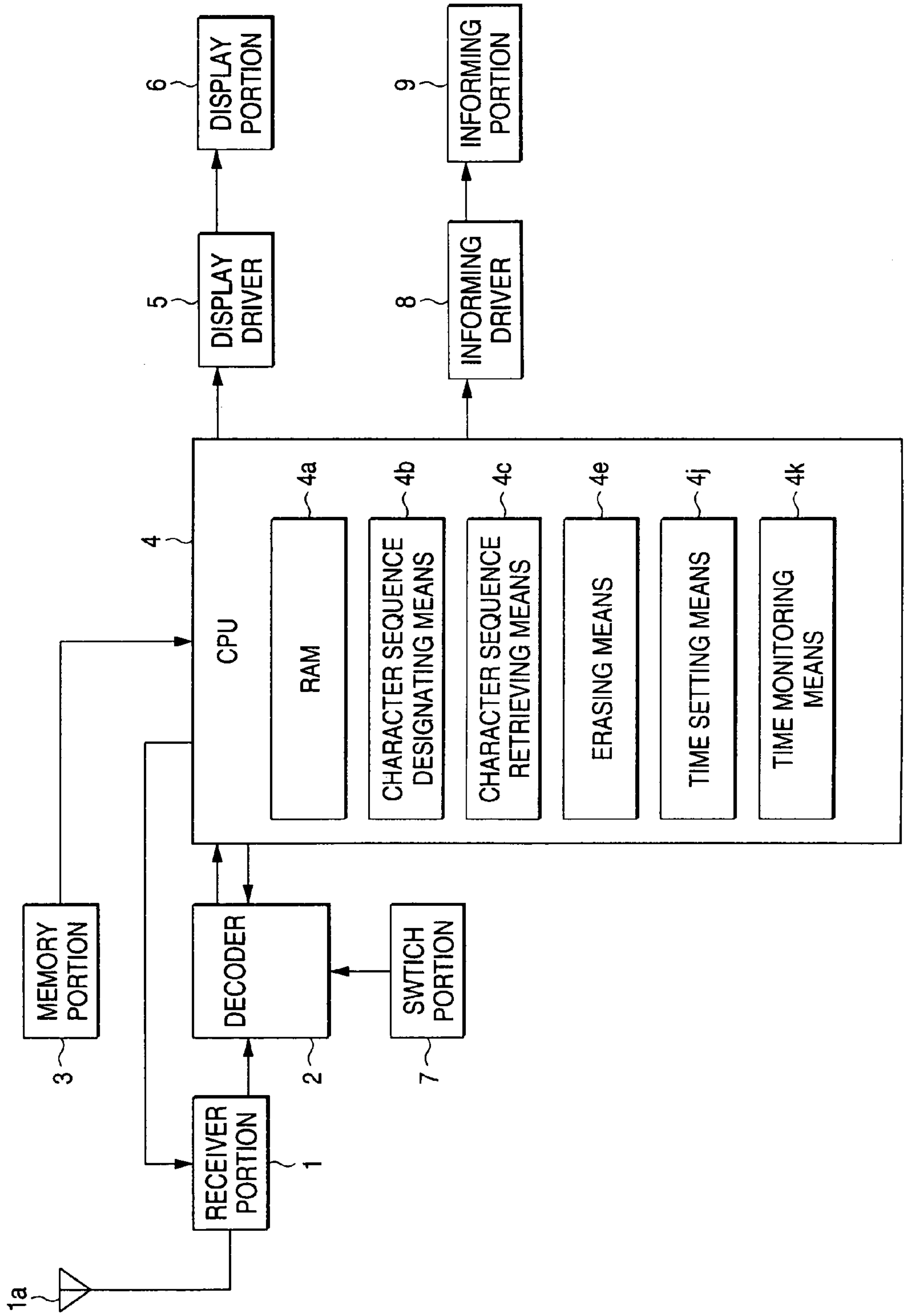
FIG. 7 is a block diagram showing a circuit configuration of a radio paging receiver according to a fourth embodiment of the present invention.

FIG. 7 is a block diagram showing a circuit configuration of the radio paging receiver according to the fourth embodiment of the present invention. In FIG. 7, the same symbols as those in FIG. 1 are affixed to constituent elements corresponding to the constituent elements which have been explained with reference to FIG. 1, and their explanation will be omitted. A difference between the radio paging receiver according to the fourth embodiment and radio paging receiver according to the first embodiment resides in that a time setting means 4*j* and a time monitoring means 4*k* are provided to the CPU 4.

In FIG. 7, the time setting means 4*j* is a means which sets a time at which the messages containing the character sequences designated by the user are to be erased automatically. This setting is executed according to an instruction signal issued by the user's operation of the switch portion 7. The time monitoring means 4*k* is a means which monitors whether or not a time coincides with an erasing time which is set by the time setting means 4*j*.

Figure 8:
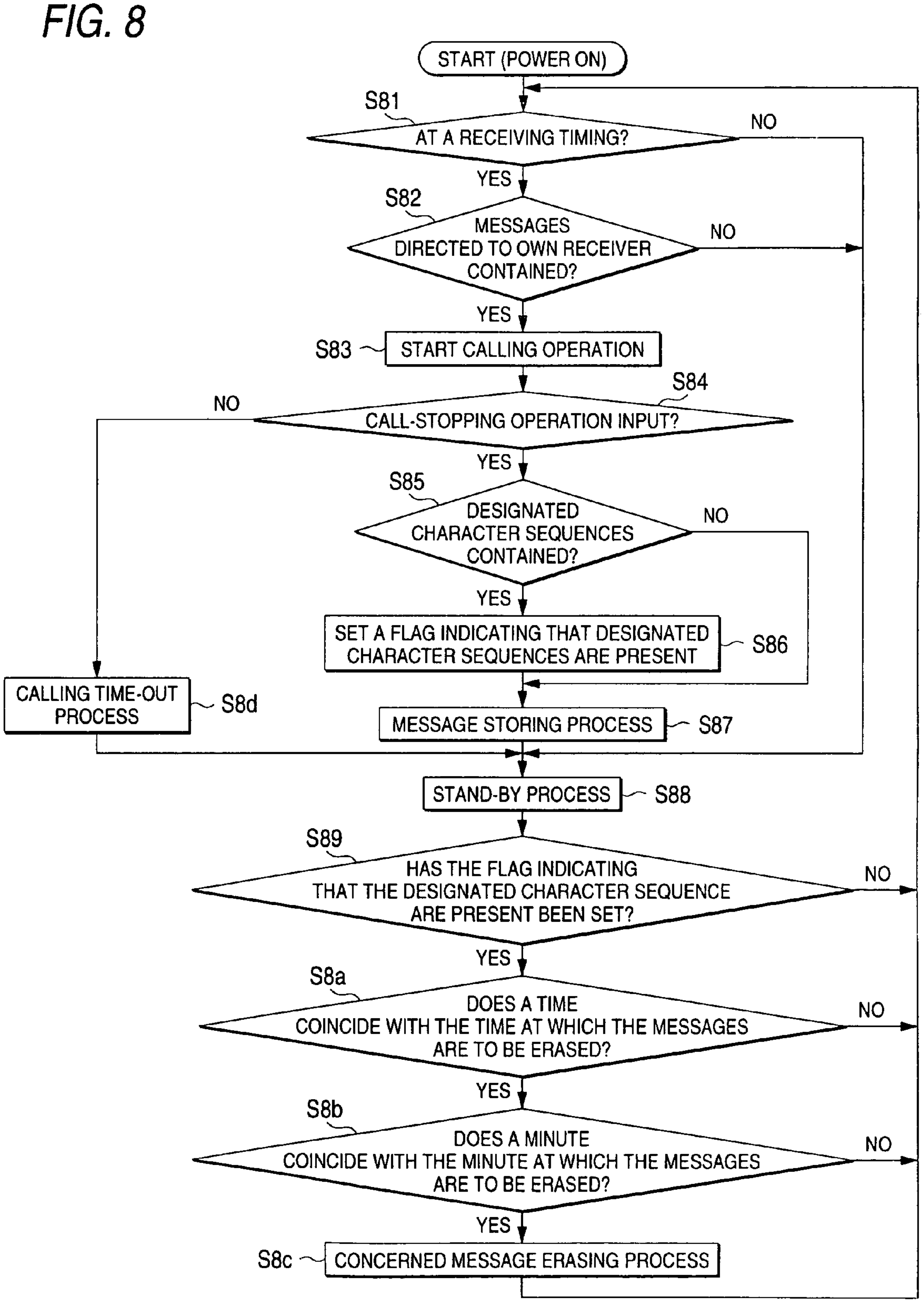
FIG. 8 is a flowchart showing a message erasing method for the radio paging receiver according to the fourth embodiment of the present invention.

FIG. 8 is a flowchart showing an automatic message erasing process in the radio paging receiver according to the fourth embodiment of the present invention. The automatic message erasing process will be explained with reference to FIG. 8 hereunder.

Under the condition of the radio paging receiver which is synchronized with the base station by turning on the power supply, the radio paging receiver decides whether or not it is at a receiving timing assigned to own radio paging receiver (step S81). Unless the radio paging receiver has been at the receiving timing in step S81, it keeps a stand-by state according to a stand-by process (step S88). If the radio paging receiver has been at the receiving timing in step S81, it decides whether or not the message (information) directed to own radio paging receiver is contained in the data being received from the base station (step S82). Unless the message directed to own radio paging receiver has been contained in step S82, the radio paging receiver is shifted into the stand-by state according to the stand-by process in step S88. If the message directed to own radio paging receiver has been contained in step S82, a calling operation is started (step S83) and then the radio paging receiver waits whether or not the call-stopping operation is input by the user (step S84). Unless the call-stopping operation has been input by the user in step S84, the radio paging receiver performs a calling time-out process after a predetermined time (step S8*d*) and then it is shifted into the stand-by state in step S88. In contrast, if the user performs the call-stopping operation by the switch portion 7 (FIG. 7) during the calling operation in step S84, the radio paging receiver retrieves whether or not the designated character sequences are contained in the received messages (step S85). Unless the designated character sequences have been contained in step S85, the messages are stored in the RAM 4*a* (FIG. 7) by the message storing process (step S87). If the designated character sequences have been contained in the received messages in step S85, a flag indicating that the designated character sequences are present is set (step S86). In this case, any character sequences can be selected previously from all the stored messages by the user as the designated character sequences by using the character sequence designating means 4*b* (FIG. 7). After the messages are stored in the RAM 4*a* (FIG. 7) according to a message storing process (step S87), the radio paging receiver is shifted into the stand-by state according to the stand-by process (step S88), and then it is decided whether or not the flag indicating that the designated character sequences are present has been set (step S89). Unless the flag has been set in step S89, the radio paging receiver keeps the stand-by state according to the stand-by process in step S88 until the receiving timing is satisfied in step S81. If the flag has been set in step S89, the time monitoring means 4*k* (FIG. 7) checks whether or not a time and minute coincide with the time and minute at which the messages are to be erased respectively (step S8*a* and step S8*b*). Unless either of the time and the minute coincides with the erasing time and minute in step S8*a* and step S8*b*, the processes from step S81 to step S8*b* are repeatedly executed. If both the time and the minute coincide with the erasing time and minute in step S8*a* and step S8*b*, the concerned messages including the designated character sequences are erased (step S8*c*).

As described above, according to the radio paging receiver of the fourth embodiment of the present invention, since the radio paging receiver is constructed to designate any character sequences in the stored messages and then erase the concerned messages including the character sequences automatically at the predetermined time and minute, complicatedness in erasing the messages unnecessary for the user can be reduced.

If the storage area in which a large quantity of received messages can be stored is provided the radio paging receiver, the similar advantage can be achieved by erasing automatically the messages at a predetermined day of the week employed in place of the above predetermined time.

Fifth Embodiment

A fifth embodiment of the present invention corresponds to a radio paging receiver which can designate any character sequences in stored messages and then erase automatically the messages containing the designated character sequences when the concerned messages are received.

Figure 9:
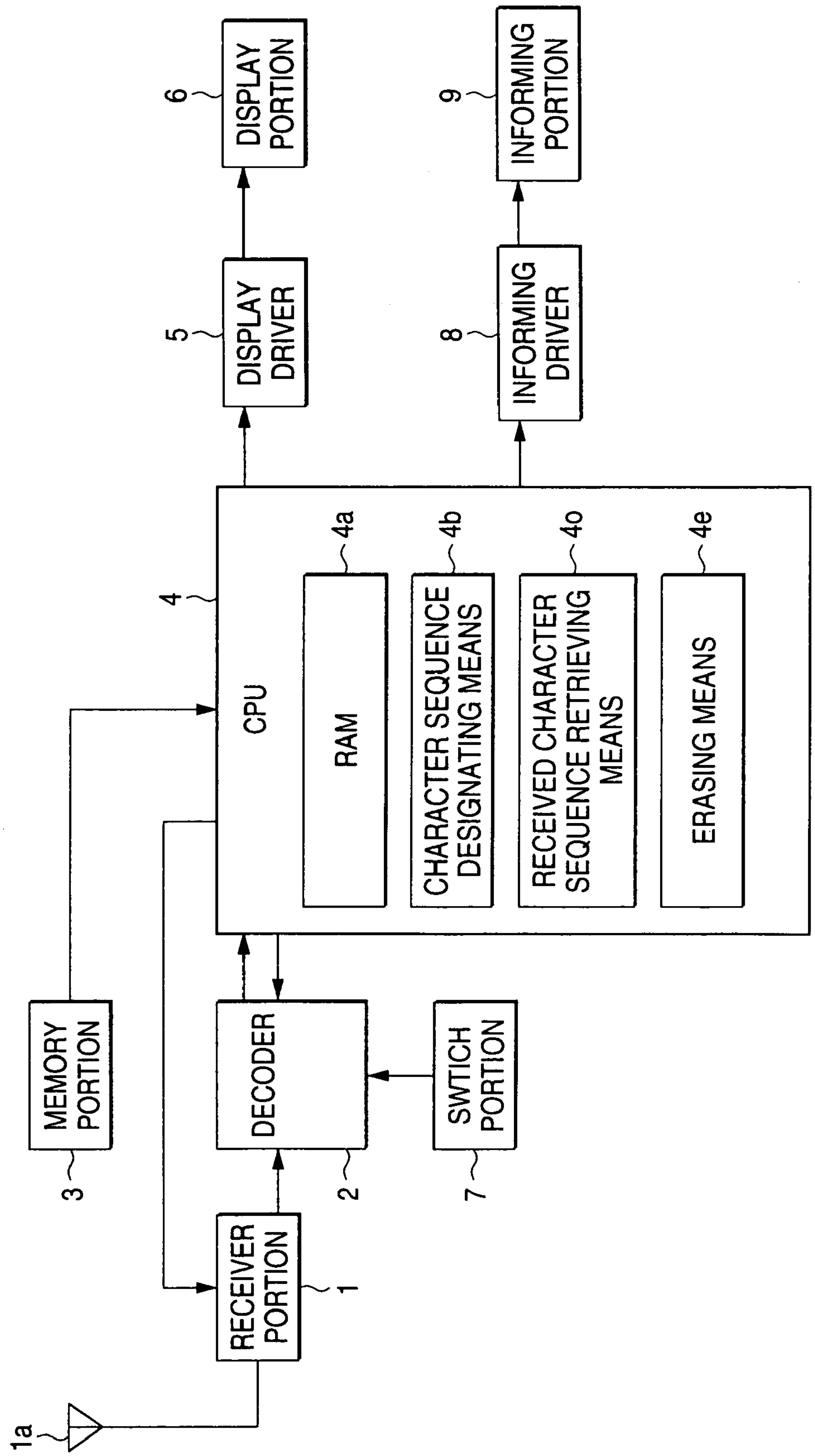
FIG. 9 is a block diagram showing a circuit configuration of a radio paging receiver according to a fifth embodiment of the present invention.

FIG. 9 is a block diagram showing a circuit configuration of the radio paging receiver according to the fifth embodiment of the present invention. In FIG. 9, the same symbols as those in FIG. 1 are affixed to constituent elements corresponding to the constituent elements which have been explained with reference to FIG. 1, and their explanation will be omitted. A difference between the radio paging receiver according to the fifth embodiment and radio paging receiver according to the first embodiment resides in that a received character sequence retrieving means 4*o* which retrieves whether or not the designated character sequences are contained in the messages after the messages are received but before they are stored is provided to the CPU 4.

In FIG. 9, the received character sequence retrieving means 4*o* is a means which does not store the received messages in the RAM 4*a* (FIG. 9) but erases automatically them if the character sequences designated by the user are contained in the received messages. Like the first embodiment, this setting of the designated character sequences is executed according to an instruction signal issued by the user's operation of the switch portion 7.

Figure 10:
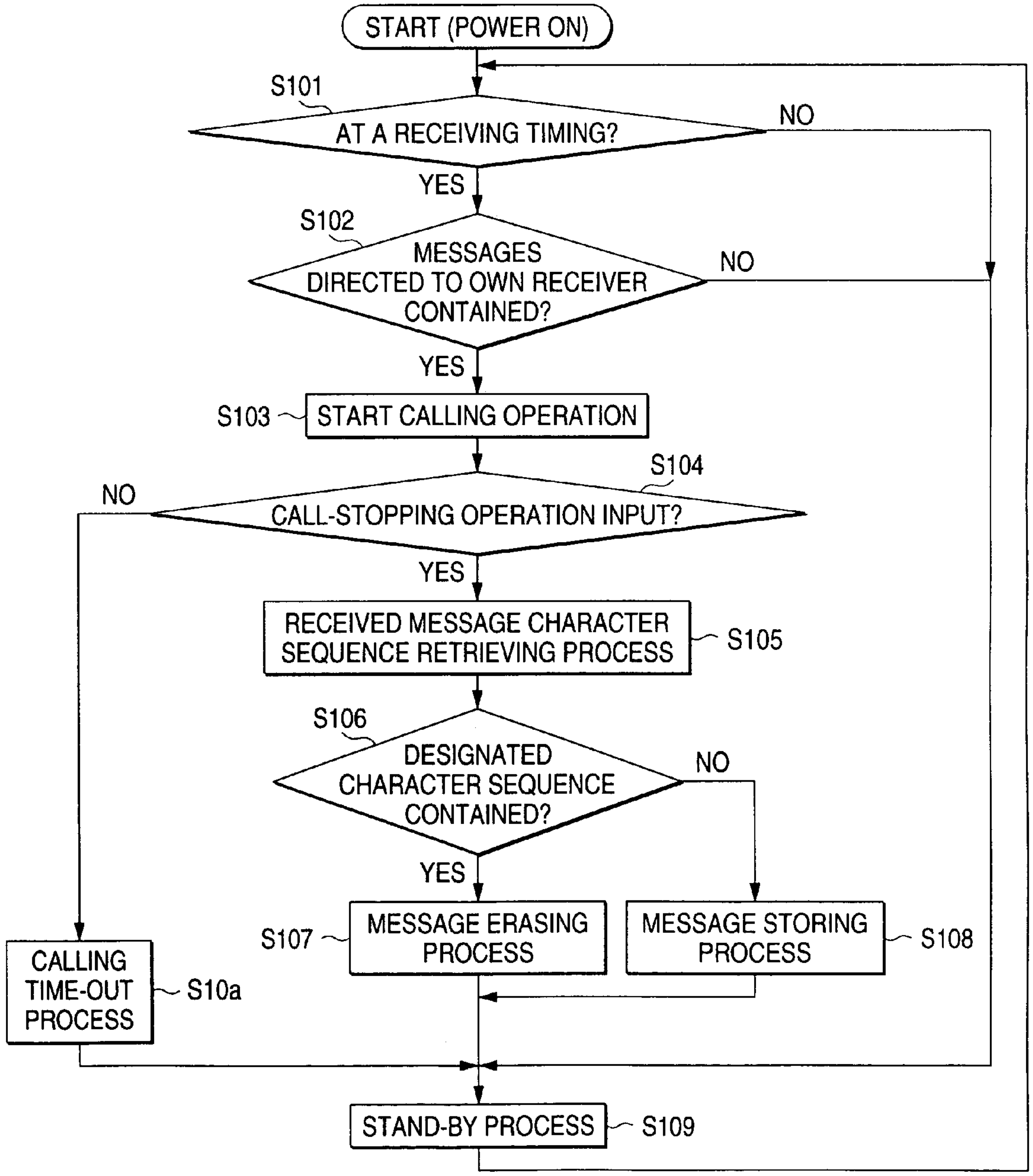
FIG. 10 is a flowchart showing a message erasing method for the radio paging receiver according to the fifth embodiment of the present invention.

FIG. 10 is a flowchart showing an automatic message erasing process in the radio paging receiver according to the fifth embodiment of the present invention. The automatic message erasing process will be explained with reference to FIG. 10 hereunder.

Under the condition of the radio paging receiver which is synchronized with the base station by turning on the power supply, the radio paging, receiver decides whether or not it is at a receiving timing assigned to own radio paging receiver (step S101). Unless the radio paging receiver has been at the receiving timing in step S101, it keeps a stand-by state according to a stand-by process (step S109). In contrast, if the radio paging receiver has been at the receiving timing in step S101, it decides whether or not the messages (information) directed to own radio paging receiver are contained in the data being received from the base station (step S102). Unless the messages directed to own radio paging receiver has been contained in step S102, the radio paging receiver is shifted into the stand-by state according to the stand-by process in step S109. While, if the messages directed to own radio paging receiver has been contained in step S102, a calling operation is started (step S103) and then the radio paging receiver waits whether or not the call-stopping operation is input by the user (step S104). Unless the call-stopping operation has been input by the user in step S104, the radio paging receiver performs a calling time-out process after a predetermined time (step S10*a*) and then it is shifted into the stand-by state in step S109. On the contrary, if the user performs the call-stopping operation by the switch portion 7 (FIG. 9) during the calling operation in step S104, the process advances to step S105 to retrieve the designated character sequences from the received messages, and then it is decided whether or not the designated character sequences have been contained in the received messages (step S106). Unless the designated character sequences have been contained in step S106, the messages are stored in the RAM 4*a* (FIG. 9) by the message storing process (step S108) and then the process proceeds to the stand-by state in step S109. In contrast, if it is decided in step S106 that the designated character sequences have been contained in the received messages, the messages are erased (step S107) and then the process also goes to the stand-by state in step S109. Subsequently, the similar processes are repeated.

As described above, according to the radio paging receiver of the fifth embodiment of the present invention, since the radio paging receiver is constructed to designate any character sequences in the stored messages and then erase the messages including the character sequences automatically when the concerned messages are received thereafter. Therefore, the message storage area can be utilized effectively because there is no necessity to store the messages which need the check only once at the time of calling.

If the character sequences which are designated by inputting the characters by using the switch portion 7 are employed instead of the character sequences which are designated in the stored messages, the similar advantage can be achieved.

Sixth Embodiment

A sixth embodiment of the present invention corresponds to a radio paging receiver which can designate hierarchies and then erase automatically the messages belonging to the designated hierarchies not to store them when the concerned messages are received.

Figure 11:
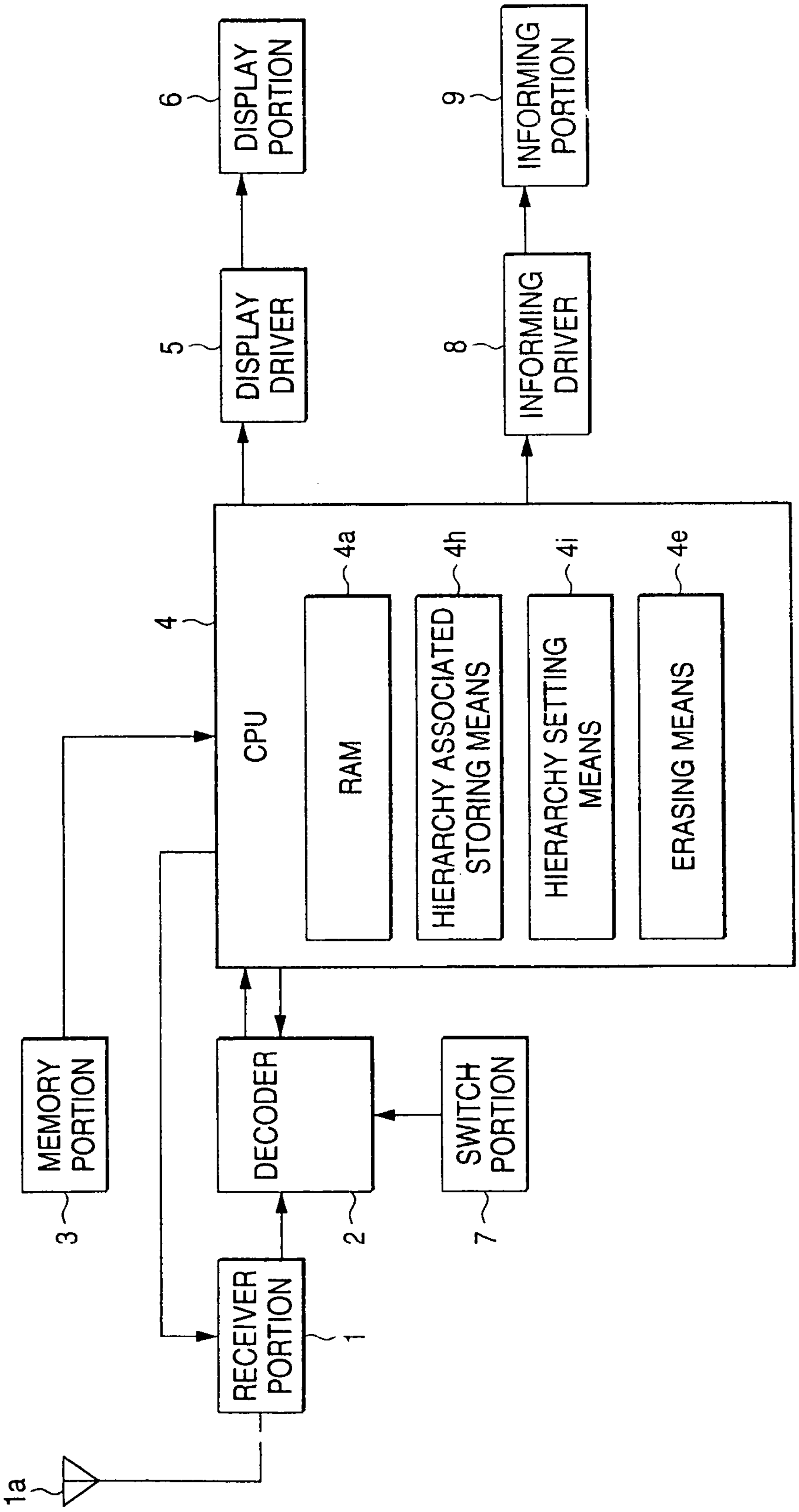
FIG. 11 is a block diagram showing a circuit configuration of a radio paging receiver according to a sixth embodiment of the present invention.

FIG. 11 is a block diagram showing a circuit configuration of the radio paging receiver according to the sixth embodiment of the present invention. In FIG. 11, the same symbols as those in FIG. 9 are affixed to constituent elements corresponding to the constituent elements which have been explained with reference to FIG. 9, and their explanation will be omitted. A difference between the radio paging receiver according to the sixth embodiment and radio paging receiver according to the fifth embodiment resides in that a hierarchy associated storing means 4*h* which stores the received messages to classify them into respective hierarchies (fields) such as sports field, weather forecast field, etc. and a hierarchy setting means 4*i* which designates hierarchies (fields) to be erased are provided to the CPU 4.

In FIG. 11 the hierarchy setting means 4*i* is a means which can set the hierarchies in which the messages are not stored in the RAM 4*a* (FIG. 11) but erased automatically when the concerned messages are received. In this case, this setting of the hierarchies is executed according to an instruction signal issued by the user's operation of the switch portion 7.

Figure 12:
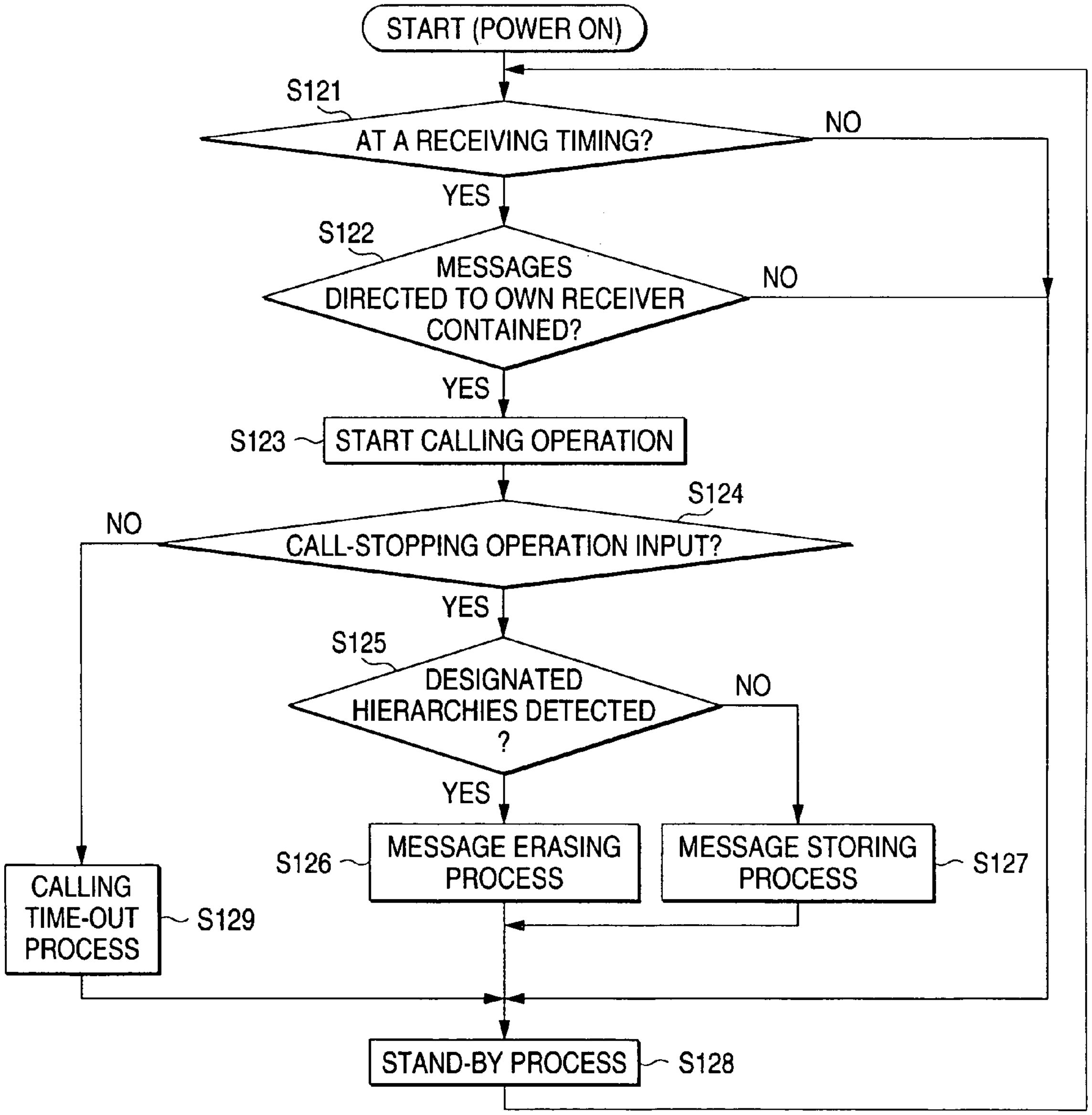
FIG. 12 is a flowchart showing a message erasing method for the radio paging receiver according to the sixth embodiment of the present invention.

FIG. 12 is a flowchart showing an automatic message erasing process in the radio paging receiver according to the sixth embodiment of the present invention. The automatic message erasing process will be explained with reference to FIG. 12 hereunder.

Under the condition of the radio paging receiver which is synchronized with the base station by turning on the power supply, the radio paging receiver decides whether or not it is at a receiving timing assigned to own radio paging receiver (step S121). Unless the radio paging receiver has been at the receiving timing in step S101, it keeps a stand-by state according to a stand-by process (step S128). In contrast, if the radio paging receiver has been at the receiving timing in step S121, it decides whether or not the messages (information) directed to own radio paging receiver are contained in the data being received from the base station (step S122). Unless the messages directed to own radio paging receiver has been contained in step S122, the radio paging receiver is shifted into the stand-by state according to the stand-by process in step S128. While, if the messages directed to own radio paging receiver has been contained in step S122, a calling operation is started (step S123) and then the radio paging receiver decides whether or not the call-stopping operation is input by the user (step S124). Unless the call-stopping operation has been input by the user in step S124, the radio paging receiver performs a calling time-out process after a predetermined time (step S129) and then it is shifted into the stand-by state in step S128. On the contrary, if the user performs the call-stopping operation by the switch portion 7 (FIG. 11) during the calling operation in step S124, the process advances to step S125 to detect whether or not the received messages belong to the designated hierarchies (fields) (step S125). Unless the received messages have belonged to the designated hierarchies in step S125, the messages are stored in the RAM 4*a* (FIG. 11) by the message storing process (step S127) and then the process proceeds to the stand-by state (step S128). In contrast, if it is decided in step S125 that the received messages have belonged to the designated hierarchies, the messages are not stored but erased (step S126) and then the process also goes to the stand-by state (step S128). Subsequently the similar processes are repeated.

As described above, according to the radio paging receiver of the sixth embodiment of the present invention, since the radio paging receiver which can receive the messages every hierarchy is constructed to designate the hierarchies and then erase automatically the messages which are to be stored in the designated hierarchies not to store them when the concerned messages are received. Therefore, the message storage area can be utilized effectively because there is no necessity to store the messages which need the check only once at the time of calling.

The similar advantage can be achieved by designating the receiving addresses in place of the designation of the hierarchies.

Seventh Embodiment

A seventh embodiment of the present invention corresponds to a radio paging receiver which can erase collectively the concerned messages if the designated character sequences are contained in the stored messages.

Figure 13:
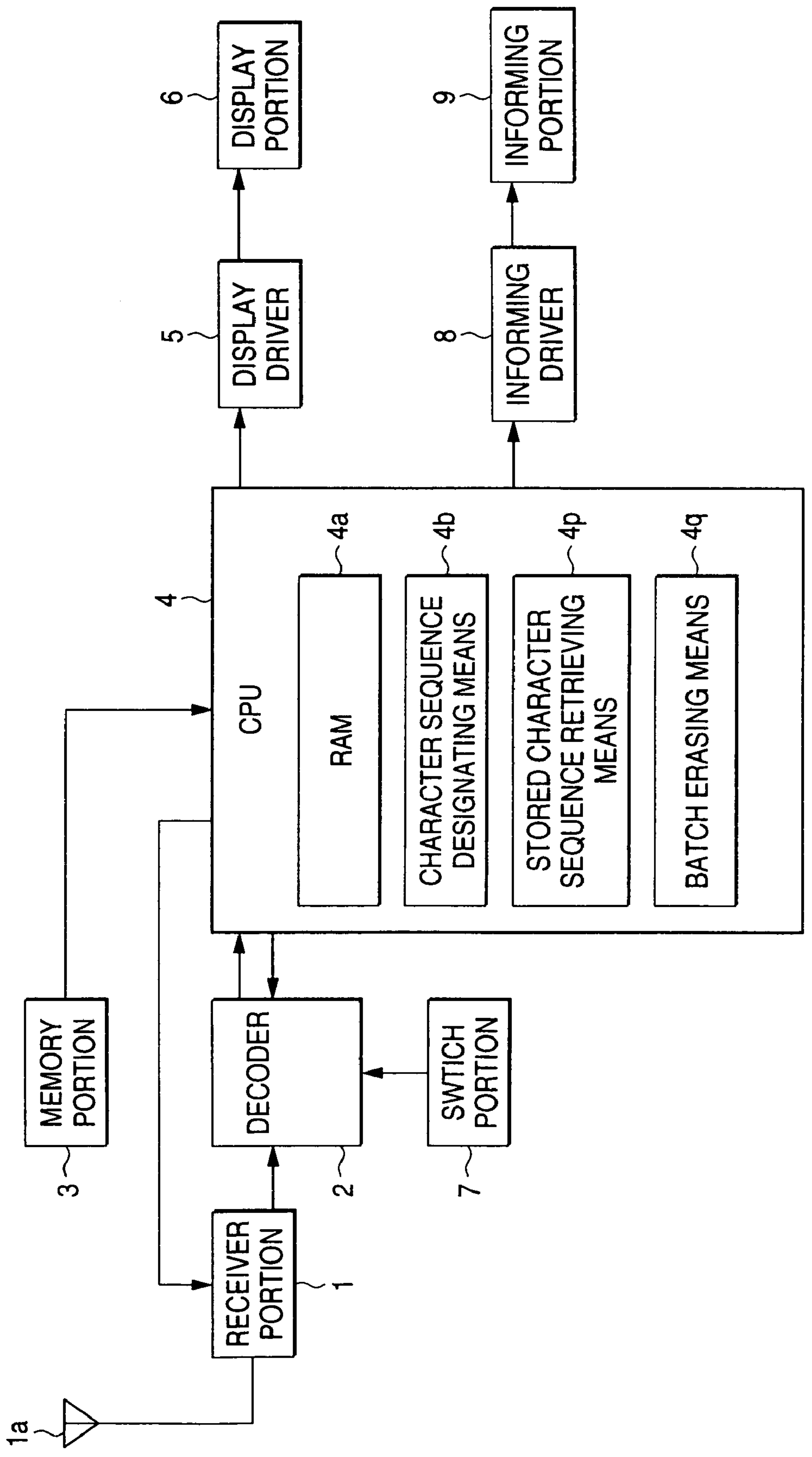
FIG. 13 is a block diagram showing a circuit configuration of a radio paging receiver according to a seventh embodiment of the present invention.

FIG. 13 is a block diagram showing a circuit configuration of the radio paging receiver according to the seventh embodiment of the present invention. In FIG. 13, the same symbols as those in FIG. 1 are affixed to constituent elements corresponding to the constituent elements which have been explained with reference to FIG. 1, and their explanation will be omitted. A difference between the radio paging receiver according to the seventh embodiment and radio paging receiver according to the first embodiment resides in that a stored character sequence retrieving means 4*p* which can retrieve whether or not the designated character sequences are contained in the messages stored in the CPU 4 and a batch erasing means 4*q* which can erase collectively the messages containing the designated character sequences are provided to the CPU 4. In this case, the setting of the character sequences by the character sequence designating means and the batch erase of the messages containing the designated character sequences by the batch erasing means 4*q* are executed according to an instruction signal issued by the user's operation of the switch portion 7.

Figure 14:
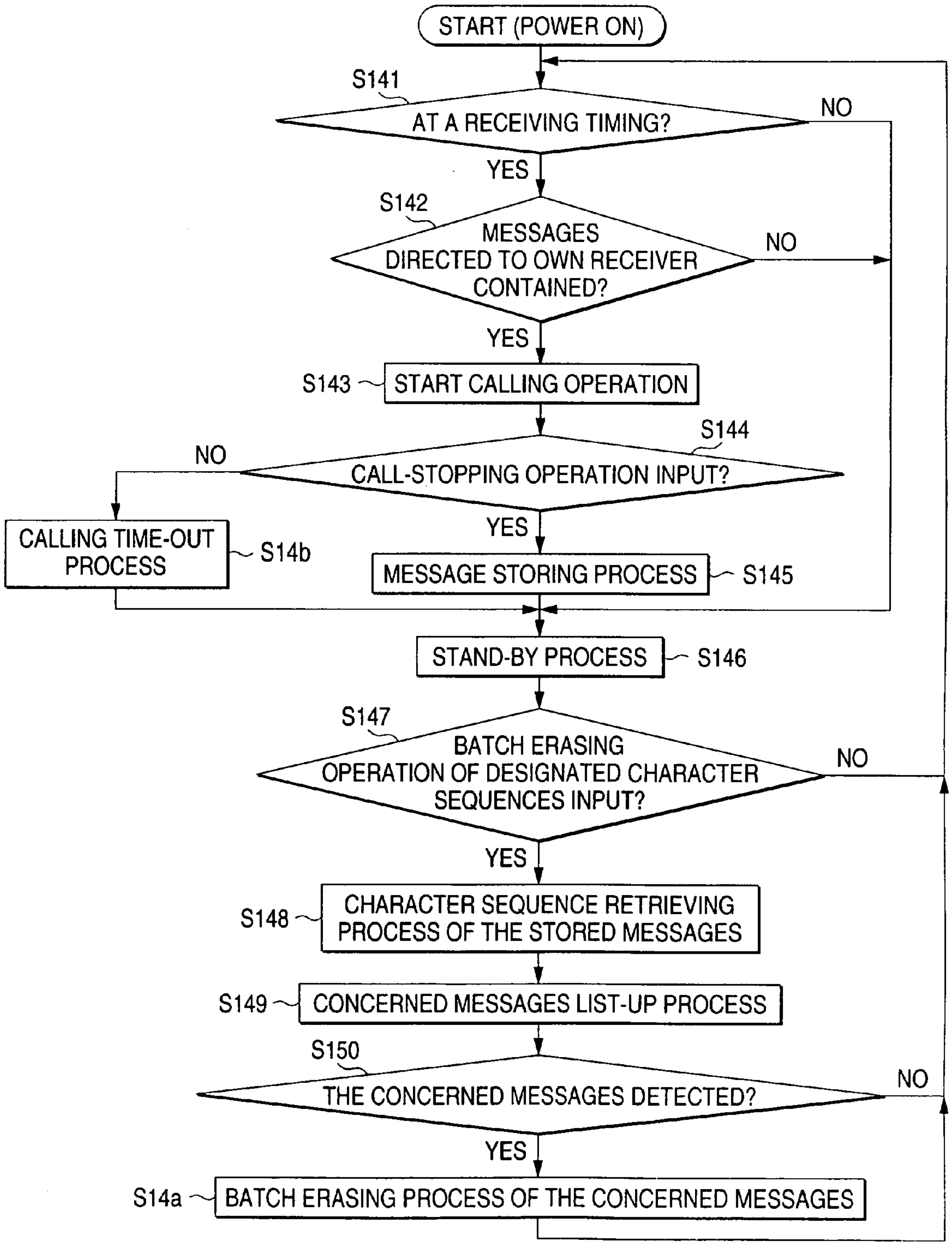
FIG. 14 is a flowchart showing a message erasing method for the radio paging receiver according to the seventh embodiment of the present invention.

FIG. 14 is a flowchart showing an automatic message erasing process in the radio paging receiver according to the seventh embodiment of the present invention. The automatic message erasing process will be explained with reference to FIG. 14 hereunder.

Under the condition of the radio paging receiver which is synchronized with the base station by turning on the power supply, the radio paging receiver decides whether or not it is at a receiving timing assigned to own radio paging receiver (step S141). Unless the radio paging receiver has been at the receiving timing in step S141, it keeps a stand-by state according to a stand-by process (step S146). In contrast, if the radio paging receiver has been at the receiving timing in step S141, it decides whether or not the messages (information) directed to own radio paging receiver are contained in the data being received from the base station (step S142). Unless the message directed to own radio paging receiver has been contained in step S142, the radio paging receiver is shifted into the stand-by state according to the stand-by process in step S146. If the message directed to own radio paging receiver has been contained in step S142, a calling operation is started (step S143) and then the radio paging receiver waits whether or not the call-stopping operation is input by the user (step S144). Unless the call-stopping operation has been input by the user in step S144, the radio paging receiver performs a calling time-out process after a predetermined time (step S14*b*) and then it is shifted into the stand-by state in step S146. In contrast, if the user performs the call-stopping operation by the switch portion 7 (FIG. 13) during the calling operation in step S144, the messages are stored in the RAM 4*a* (FIG. 13) by the message storing process (step S145) and then the process goes to the stand-by state according to the stand-by process (step S146). During the stand-by state, it is detected whether or not the batch erasing operation of the designated character sequences is executed by the user (step S147). Unless the batch erasing operation of the designated character sequences has been executed by the user in step S147, the processes from step S141 to step S147 are executed repeatedly. If the batch erasing operation of the designated character sequences has been executed by the user in step S147 during the stand-by state, the designated character sequences contained in the messages stored in the RAM 4*a* (FIG. 13) are retrieved by using the stored character sequence retrieving means 4*p* (FIG. 13) (step S148) and then the messages containing the designated character sequences are listed up (step S149). Then, it is decided whether or not the concerned messages are detected (S150). If it is decided in step S150 that no concerned message has been detected, the processes from step S141 to step S147 are executed repeatedly. If it is decided in step S150 that the messages containing the designated character sequences have been detected, all the messages containing the designated character sequences are erased by using the batch erasing means 4*q* (FIG. 13) (step S14*a*).

As described above, according to the radio paging receiver of the seventh embodiment of the present invention, since the radio paging receiver is constructed to erase the concerned messages collectively when the designated character sequences are contained in the stored messages, complicatedness in erasing the messages unnecessary for the user can be reduced.

The similar advantage can be achieved if the character sequences are set by inputting the characters by using the switch portion 7 unless they are designated from the stored messages.

Eighth Embodiment

A eighth embodiment of the present invention corresponds to a radio paging receiver which can erase collectively the concerned messages if the designated character sequences are contained in the messages having the designated addresses.

Figure 15:
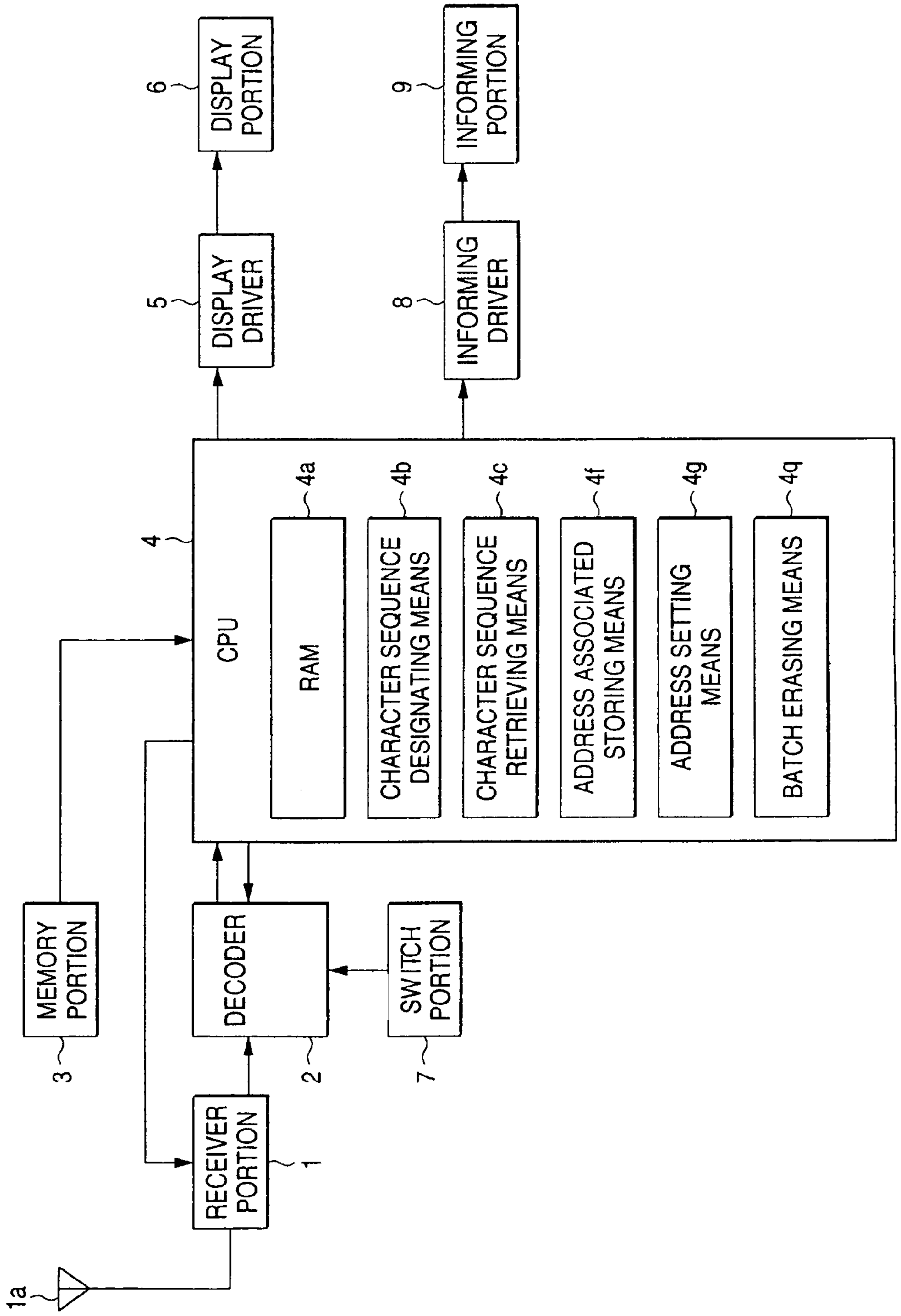
FIG. 15 is a block diagram showing a circuit configuration of a radio paging receiver according to an eighth embodiment of the present invention.

FIG. 15 is a block diagram showing a circuit configuration of the radio paging receiver according to the eighth embodiment of the present invention. In FIG. 15, the same symbols as those in FIG. 13 are affixed to constituent elements corresponding to the constituent elements which have been explained with reference to FIG. 13, and their explanation will be omitted. A difference between the radio paging receiver according to the eighth embodiment and radio paging receiver according to the seventh embodiment resides in that the address associated storing means 4*f* which can store the messages according to respective addresses received by the CPU 4, the address setting means 4*g* which can set the addresses by which the character sequences are to be retrieved, and the messages containing the designated character sequences are provided to the CPU 4. In this case, the setting of the character sequences by the character sequence designating means 4*b*, the setting of the address to be erased collectively, and the batch erase of the messages containing the designated character sequences by the batch erasing means 4*q* are executed according to an instruction signal issued by the user's operation of the switch portion 7.

Figure 16:
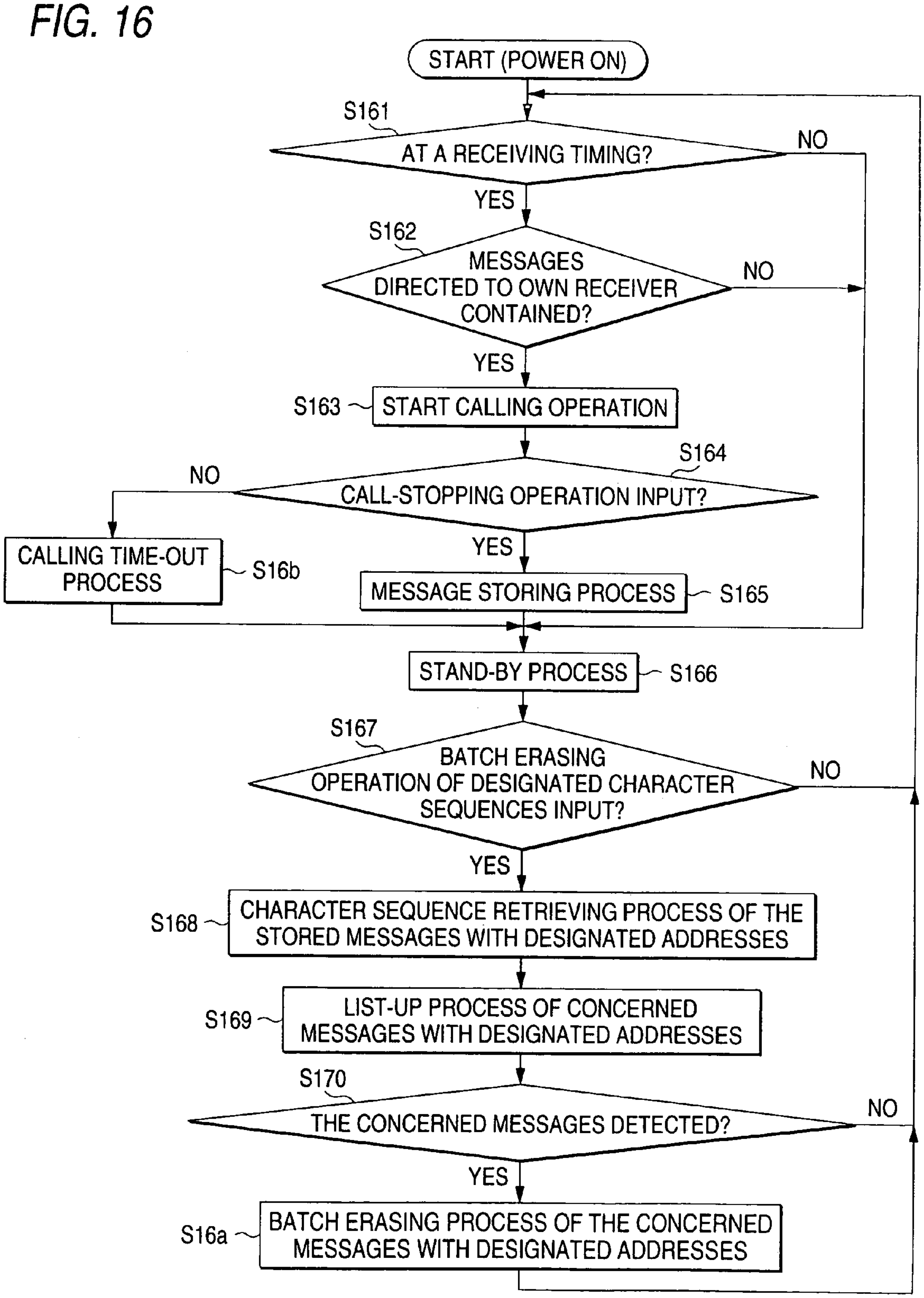
FIG. 16 is a flowchart showing a message erasing method for the radio paging receiver according to the eighth embodiment of the present invention.
Figure 17:
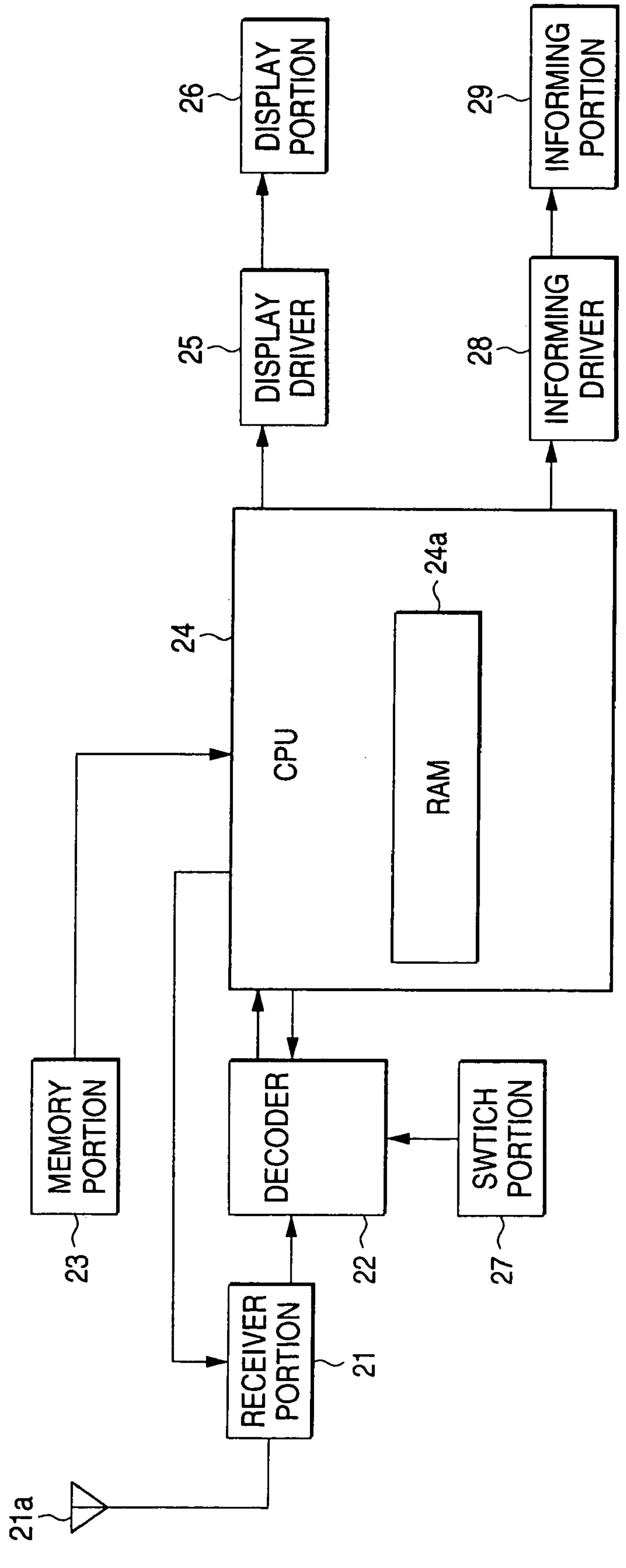
FIG. 17 PRIOR ART
FIG. 17 is a block diagram showing a circuit configuration of a radio paging receiver in the prior art.

FIG. 16 is a flowchart showing an automatic message erasing process in the radio paging receiver according to the eighth embodiment of the present invention. The automatic message erasing process will be explained with reference to FIG. 16 hereunder.

Under the condition of the radio paging receiver which is synchronized with the base station by turning on the power supply, the radio paging receiver decides whether or not it is at a receiving timing assigned to own radio paging receiver (step S161). Unless the radio paging receiver has been at the receiving timing in step S161, it keeps a stand-by state according to a stand-by process (step S166). In contrast, if the radio paging receiver has been at the receiving timing in step S161, it decides whether or not the messages (information) directed to own radio paging receiver are contained in the data being received from the base station (step S162). Unless the message directed to own radio paging receiver has been contained in step S162, the radio paging receiver is shifted into the stand-by state according to the stand-by process in step S166. If the message directed to own radio paging receiver has been contained in step S162, a calling operation is started (step S163) and then the radio paging receiver waits whether or not the call-stopping operation is input by the user (step S164). Unless the call-stopping operation has been input by the user in step S164, the radio paging receiver performs a calling time-out process after a predetermined time (step S16*b*) and then it is shifted into the stand-by state in step S166. In contrast, if the user performs the call-stopping operation by the switch portion 7 (FIG. 15) during the calling operation in step S164, the process goes to step S165.

Then, the messages are stored in the RAM 4*a* (FIG. 15) by the message storing process (step S165) and then the process goes to the stand-by state according to the stand-by process (step S166). During the stand-by state, it is detected whether or not the batch erasing operation of the designated character sequences is executed by the user (step S167). Unless the batch erasing operation of the designated character sequences has been executed by the user in step S167, the processes from step S161 to step S167 are executed repeatedly. In contrast, if the batch erasing operation of the designated character sequences has been executed by the user in step S167 during the stand-by state, the designated character sequences contained in the messages, which are stored in the RAM 4*a* (FIG. 15) and have the addresses being set by the address setting means 4*g* (FIG. 15), are retrieved from the messages whose received addresses are identified, by using the character sequence retrieving means 4*c* (FIG. 15) (step S168), and then the messages containing the designated character sequences are listed up (step S169). Then, it is decided whether or not the concerned messages are detected from the designated addresses (S170). If it is decided in step S170 that no concerned message has been detected from the designated addresses, the processes from step S161 to step S167 are executed repeatedly. If it is decided in step S170 that the messages containing the designated character sequences have been detected from the designated addresses, all the messages containing the designated character sequences are erased from the designated addresses by using the batch erasing means 4*q* (FIG. 15) (step S16*a*).

As described above, according to the radio paging receiver of the eighth embodiment of the present invention, since the radio paging receiver is constructed to erase the concerned messages collectively when the designated character sequences are contained in the messages having the designated addresses, complicatedness in erasing the messages unnecessary for the user can be reduced.

When any hierarchies are set in place of the received addresses and then the messages to be stored in the hierarchies are received after the any hierarchies have been set, the similar advantage can be achieved by erasing automatically the concerned messages not to store them.

The above radio paging receiver may be employed singly, but such radio paging receiver may be employed in combination with the mobile telephone, etc.

As described above, according to the present invention, the radio paging receiver comprises the character sequence designating means for designating character sequences in stored messages, the character sequence retrieving means for detecting whether or not designated character sequences are contained in stored messages, the time counting means for monitoring whether or not a predetermined time has lapsed after the messages are stored; and the erasing means for erasing the stored messages from a storage area. Therefore, there can be achieved such an advantage that concerned messages can be erased automatically after the predetermined time has lapsed, and thus complicatedness in erasing the unnecessary messages can be reduced.

Also, the radio paging receiver comprises a character sequence inputting means, the character sequence retrieving means, the time counting means, and the erasing means. Therefore, there can be achieved such an advantage that the messages containing designated character sequences can be erased automatically after a predetermined time has been lapsed, and thus complicatedness in erasing the unnecessary messages can be reduced.

Also, the radio paging receiver comprises the address associated storing means for storing the message data picked up by the first decoding means every calling address, the address setting means for designating the calling addresses as objects of erasure by time counting, the time counting means, and the erasing means. Therefore, there can be achieved such an advantage that the messages having the addresses designated can be erased automatically after a predetermined time has been lapsed and thus complicatedness in erasing the messages having a low degree of importance can be reduced.

Also, the radio paging receiver comprises the hierarchy associated storing means for storing the message data which are picked up by the second decoding means every hierarchy, the hierarchy setting means for designating hierarchies as objects of erasure by time counting, the time counting means, and the erasing means. Therefore, there can be achieved such an advantage that the messages belonging to the hierarchies can be erased automatically after a predetermined time has been lapsed and thus complicatedness in erasing the messages belonging to hierarchies having a low degree of importance can be reduced.

Also, the radio paging receiver comprises the time setting means for inputting times as timings for erasure of the messages by a user, the time monitoring means for monitoring whether or not a time coincides with an input time, and the erasing means. Therefore, there can be achieved such an advantage that the messages can be erased periodically and thus complicatedness in erasing the unnecessary messages can be reduced.

Also, the radio paging receiver comprises the day-of-the-week setting means for inputting a day of the week, the day-of-the-week monitoring means for monitoring whether or not a day of the week coincides with an input day of the week; and the erasing means. Therefore, there can be achieved such an advantage that the messages can be erased periodically at respective days of the week and thus complicatedness in erasing the unnecessary messages can be reduced.

Also, the radio paging receiver comprises the character sequence designating means for designating character sequences in stored messages, the received character sequence retrieving means for detecting whether or not designated character sequences are contained in received messages, and the erasing means for erasing the messages. Therefore, there can be achieved such an advantage that the messages cannot be stored in the storage area but can be erased after the messages have been checked when designated character sequences are contained in the received messages, so that the message storage area can be utilized effectively because there is no necessity to store the messages in the message storage area.

Also, the radio paging receiver comprises the character sequence inputting means, the character sequence retrieving means, and the erasing means. Therefore, there can be achieved such an advantage that the character sequences which are retrieved to erase messages can be input by the character sequence inputting means, so that the message storage area can be utilized effectively because there is no necessity to store the messages in the message storage area.

Also, the radio paging receiver comprises the storing means for storing the message data which are picked up by the second decoding means every address, the address setting means for designating addresses as objects of erasure at a time of reception, and the erasing means. Therefore, there can be achieved such an advantage that the messages related to particular addresses cannot be stored in the storage area but can be erased, so that the message storage area can be utilized effectively.

Also, the radio paging receiver comprises the second storing means for storing the message data which are picked up by the third decoding means every hierarchy, the hierarchy setting means for designating hierarchies as objects of erasure, and the erasing means. Therefore, there can be achieved such an advantage that the messages belonging to particular hierarchies cannot be stored in the storage area but can be erased, so that the message storage area can be utilized effectively.

Also, the radio paging receiver comprises the character sequence designating means for designating character sequences in stored messages, the stored character sequence retrieving means for detecting whether or not designated character sequences are contained in stored messages, and the erasing means for erasing the messages. Therefore, there can be achieved such an advantage that the messages can be erased collectively and thus complicatedness in erasing the unnecessary messages can be reduced.

Also, the radio paging receiver comprises the character sequence inputting means, the character sequence retrieving means, and the erasing means. Therefore, there can be achieved such an advantage that the messages containing the character sequences can be erased collectively and thus complicatedness in erasing the unnecessary messages can be reduced and operability can be enhanced.

Also, the radio paging receiver comprises the first storing means for storing the message data which are picked up by the second decoding means every address, the address setting means for designating addresses as objects of erasure according to character sequence conditions, and the erasing means. Therefore, there can be achieved such an advantage that the messages containing the designated character sequences having particular addresses can be erased collectively and thus complicatedness in erasing the unnecessary messages can be reduced and also operability can be enhanced.

Also, the radio paging receiver comprises the second storing means for storing the message data which are picked up by the third decoding means every hierarchy, the hierarchy setting means for designating hierarchies as objects of erasure according to character sequence conditions, and the erasing means. Therefore, there can be achieved such an advantage that the messages belonging to particular hierarchies can be erased collectively when the messages contain designated character sequences and thus complicatedness in erasing the unnecessary messages can be reduced and also erasing operability can be enhanced.

What is claimed is:

1. A radio paging receiver comprising:

receiving means for receiving a radio signal from a base station of a radio paging system;

holding means for holding at least of calling address assigned to own receiver;

first decoding means for picking up message data corresponding to the calling address or the calling addresses from the radio signal;

data storing means for storing the message data;

character sequence designating means for designating character sequences in stored messages;

character sequence retrieving means for detecting whether or not designated character sequences are contained in stored messages;

time counting means for monitoring whether or not a predetermined time has lapsed after the messages are stored;

erasing means for erasing the stored messages from a storage area; and first controlling means for causing the erasing means to erase concerned messages when it is detected by the character sequence retrieving means that the designated character sequences are contained in the stored messages and it is detected by the time counting means that the predetermined time has lapsed after the messages are stored.

2. A radio paging receiver according to claim 1, further comprising a character sequence inputting means for inputting character sequences which are retrieved to erase messages.

3. A radio paging receiver according to claim 1, further comprising:

address associated storing means for storing the message data picked up by the first decoding means every calling address;

address setting means for designating the calling addresses as objects of erasure by time counting; and second controlling means for causing the erasing means to erase the messages based on signals from the address setting means and the time counting means.

4. A radio paging receiver according to claim 1, further comprising:

second decoding means for picking up message data which are classified into a hierarchical structure and transmitted to own address;

hierarchy associated storing means for storing the message data which are picked up by the second decoding means every hierarchy; and hierarchy setting means for designating hierarchies as objects of erasure by time counting;

wherein erasure of the messages is effected by the hierarchy setting means and the time counting means.

5. A radio paging receiver according to any one of claims 1 to 4, further comprising:

time setting means for inputting times as timings for erasure of the messages by a user; and time monitoring means for monitoring whether or not a time coincides with an input time;

wherein the erasure of the messages is effected periodically at respective times which are input by the user.

6. A radio paging receiver according to any one of claims 1 to 4, further comprising:

day-of-the-week setting means for inputting a day of the week as timings for erasure of the messages by a user; and day-of-the-week monitoring means for monitoring whether or not a day of the week coincides with an input day of the week;

wherein the erasure of the messages is effected periodically at respective days of the week which are input by the user.

7. A radio paging receiver comprising:

receiving means for receiving a radio signal from a base station of a radio paging system;

first decoding means for picking up one calling address or a plurality of calling addresses assigned to own receiver from the radio signal received by the receiving means and also picking up message data corresponding to the calling address or the calling addresses;

data storing means for storing the message data picked up by the first decoding means;

holding means for holding at least of calling address assigned to own receiver;

character sequence designating means for designating character sequences in stored messages;

received character sequence retrieving means for detecting whether or not designated character sequences are contained in received messages; and erasing means for erasing the messages;

wherein, when designated character sequences are contained in the received messages, the messages are not stored in a storage area but automatically erased after the messages have been checked.

8. A radio paging receiver according to claim 7, further comprising character sequence inputting means for inputting character sequences which are retrieved to erase messages.

9. A radio paging receiver according to claim 7, further comprising:

second decoding means for picking up a plurality of calling addresses assigned to own receiver and picking up message data which are transmitted to own address;

storing means for storing the message data which are picked up by the second decoding means every address; and address setting means for designating addresses as objects of erasure at a time of reception;

wherein the messages related to particular addresses are not stored in the storage area, but erased after the messages have been checked.

10. A radio paging receiver according to claim 7, further comprising:

third decoding means for picking up message data which are classified into a hierarchical structure and transmitted to own address;

second storing means for storing the message data which are picked up by the third decoding means every hierarchy; and hierarchy setting means for designating hierarchies as objects of erasure at a time of reception;

wherein the messages belonging to particular hierarchies are not stored in the storage area, but erased after the messages have been checked.

11. A radio paging receiver comprising:

receiving means for receiving a radio signal from a base station of a radio paging system;

first decoding means for picking up one calling address or a plurality of calling addresses assigned to own receiver from the radio signal received by the receiving means and also picking up message data corresponding to the calling address or the calling addresses;

data storing means for storing the message data picked up by the first decoding means;

holding means for holding at least of calling address assigned to own receiver;

character sequence designating means for designating character sequences in stored messages;

stored character sequence retrieving means for detecting whether or not designated character sequences are contained in the message data picked up by the first decoding means stored in the data storing means; and erasing means for erasing the messages;

wherein, when designated character sequences are contained in the stored messages, the messages are erased collectively concerned messages.

12. A radio paging receiver according to claim 11, further comprising a character sequence inputting means for inputting character sequences which are retrieved to erase collectively messages.

13. A radio paging receiver according to claim 11 or claim 12, further comprising:

a second decoding means for picking up a plurality of calling addresses assigned to own receiver and picking up message data which are transmitted to own address;

a first storing means for storing the message data which are picked up by the second decoding means every address; and an address setting means for designating addresses as objects of erasure according to character sequence conditions;

wherein the messages related to particular addresses can be erased collectively when the messages contain designated character sequences.

14. A radio paging receiver according to claim 11 or claim 12, further comprising:

third decoding means for picking up message data which are classified into a hierarchical structure and transmitted to own address;

second storing means for storing the message data which are picked up by the third decoding means every hierarchy; and hierarchy setting means for designating hierarchies as objects of erasure according to character sequence conditions;

wherein the messages belonging to particular hierarchies can be erased collectively when the messages contain designated character sequences.

15. A message erasing method comprising the steps of:

receiving a radio signal from a base station of a radio paging system;

picking up one calling address or a plurality of calling addresses assigned to own receiver from received radio signal; picking up message data corresponding to the calling address or the calling addresses;

storing message data being picked up;

designating character sequences in stored messages;

detecting whether or not designated character sequences are contained in stored messages;

monitoring whether or not a predetermined time has lapsed after the messages have been stored; and erasing concerned messages if designated character sequences are contained in the stored messages and it is detected by the time counting means that the predetermined time has lapsed after the messages are stored.

16. A message erasing method according to claim 15, wherein erasure of the messages is effected by inputting character sequences, which are retrieved to erase messages, via a character sequence inputting means.

17. A message erasing method according to claim 15, wherein the message data being picked up are stored every calling address, the calling addresses as objects of erasure by time counting are designated, and the erasure of the messages is effected by the addresses and the time counting.

18. A message erasing method according to claim 15, wherein message data which are classified into a hierarchical structure and transmitted to own address are picked up, the message data which are picked up are stored every hierarchy, hierarchies acting as objects of erasure by time counting are designated, and erasure of the messages is effected by the hierarchy setting and the time counting.

19. A message erasing method according to any one of claims 15 to 18, wherein times as timings for erasure of the messages are input by a user, it is monitored whether or not a time coincides with an input time, and the erasure of the messages is effected periodically at respective times which are input by the user.

20. A message erasing method according to any one of claims 15 to 18, wherein a day of the week acting as timings for erasure of the messages is input by a user, it is monitored whether or not a day of the week coincides with an input day of the week, and the erasure of the messages is effected periodically at respective days of the week which are input by the user.

21. A message erasing method comprising the steps of:

receiving a radio signal from a base station of a radio paging system;

picking up one calling address or a plurality of calling addresses assigned to own receiver from the radio signal received;

picking up message data corresponding to the calling address or the calling addresses;

storing the message data being picked up;

designating character sequences in stored messages;

detecting whether or not designated character sequences are contained in received messages; and automatically erasing the messages not to store in a storage area after the messages have been checked when designated character sequences are contained in the received messages.

22. A message erasing method according to claim 21, wherein character sequences which are retrieved to erase messages are input via a character sequence inputting means.

23. A message erasing method according to claim 21, wherein a plurality of calling addresses assigned to own receiver are picked up, message data which are transmitted to own address are picked up, the message data which are picked up by the second decoding means are stored every address, addresses as objects of erasure at a time of reception are designated, and the messages related to particular addresses are not stored in the storage area but erased after the messages have been checked.

24. A message erasing method according to claim 21, wherein message data which are classified into a hierarchical structure and transmitted to own address are picked up, the message data which are picked up by the third decoding means are stored every hierarchy, hierarchies acting as objects of erasure at a time of reception are designated, and the messages belonging to particular hierarchies are not stored in the storage area but erased after the messages have been checked.

25. A message erasing method comprising the steps of:

receiving a radio signal from a base station of a radio paging system;

picking up one calling address or a plurality of calling addresses assigned to own receiver from the radio signal being received;

picking up message data corresponding to the calling address or the calling addresses from the radio signal being received, storing messages contained in the message data as original messages;

designating character sequences which are included in the original messages;

detecting whether or not the designated character sequences are contained in the stored messages; and erasing concerned messages collectively, the concerned messages being those of the stored messages that contain the designated character sequences.

26. A message erasing method according to claim 25, wherein the character sequences which are designated to collectively erase messages are input via a character sequence inputting means.

27. A message erasing method according to claim 25 or claim 26, wherein the message data which are picked up are stored by address, addresses acting as objects of erasure are designated according to character sequence conditions, and messages related to particular addresses can be erased collectively when the messages contain the designated character sequences.

28. A message erasing method according to claim 25 or claim 26, wherein message data which are classified into a hierarchical structure and transmitted to own address are picked up, the message data which are picked up are stored hierarchically, hierarchies as objects of erasure are designated according to character sequence conditions, and the messages belonging to particular hierarchies can be erased collectively when the messages contain designated character sequences.

29. A message erasing method of a radio paging receiver comprising the steps of:

receiving a message via a radio transmission from a base station of a radio paging system;

storing the message as an original message in a storage device of the radio paging receiver;

inputting a character sequence that is included in the original message, the character sequence being designated by a user;

retrieving from the storage device the original message that contains the character sequence designated in the step of inputting; and erasing the message retrieved in the step of retrieving the original message.

* * * * *